United States Patent
Schminkey

(10) Patent No.: US 9,051,025 B2
(45) Date of Patent: Jun. 9, 2015

(54) HUMAN PROPULSION SYSTEM

(71) Applicant: Kevin Alan Schminkey, Grand Rapids, MN (US)

(72) Inventor: Kevin Alan Schminkey, Grand Rapids, MN (US)

(73) Assignee: Kevin Alan Schminkey, Grand Rapids, MN (US)

( * ) Notice: Subject to any disclaimer, the term of this patent is extended or adjusted under 35 U.S.C. 154(b) by 83 days.

(21) Appl. No.: 13/861,355

(22) Filed: Apr. 11, 2013

(65) Prior Publication Data

US 2014/0306421 A1 Oct. 16, 2014

(51) Int. Cl.
*B62D 1/16* (2006.01)
*B62M 1/14* (2006.01)

(52) U.S. Cl.
CPC ....................................... *B62M 1/14* (2013.01)

(58) Field of Classification Search
USPC .......................... 280/244, 245, 246, 247, 248
See application file for complete search history.

(56) References Cited

U.S. PATENT DOCUMENTS

| 7,584,976 B2 * | 9/2009 | Bayne et al. | 280/244 |
| 8,118,320 B2 * | 2/2012 | Lee | 280/240 |
| 2004/0051272 A1 * | 3/2004 | Wong | 280/244 |
| 2006/0267309 A1 * | 11/2006 | Markovic | 280/246 |
| 2011/0309596 A1 * | 12/2011 | Holmes et al. | 280/246 |
| 2012/0299267 A1 * | 11/2012 | Zacchi | 280/248 |

* cited by examiner

*Primary Examiner* — Kevin Hurley

(57) ABSTRACT

A human-propulsion-system utilizing a telescoping arm lever assembly and an optional pedal assembly to be adapted to or incorporated into other mechanisms including, but not limited to, wheelchairs and vehicles. The arm lever assembly and the pedal assembly can be utilized in combination or independently further being operatively connected to a converter that utilizes gears and clutches to receive the reciprocal movements of the arm lever assembly and the rotational movements of the pedal assembly converting them into a combined unidirectional output. The arm lever assembly utilizes a slide mechanism that correspondingly moves the load end closer to the fulcrum point when the arm lever assembly is extended and correspondingly moves the load end farther away from the fulcrum point when the arm lever assembly is retracted offering a range of adjustable leverages. The arm lever assembly is further rotated left or right to provide a means of (steering) control.

20 Claims, 27 Drawing Sheets

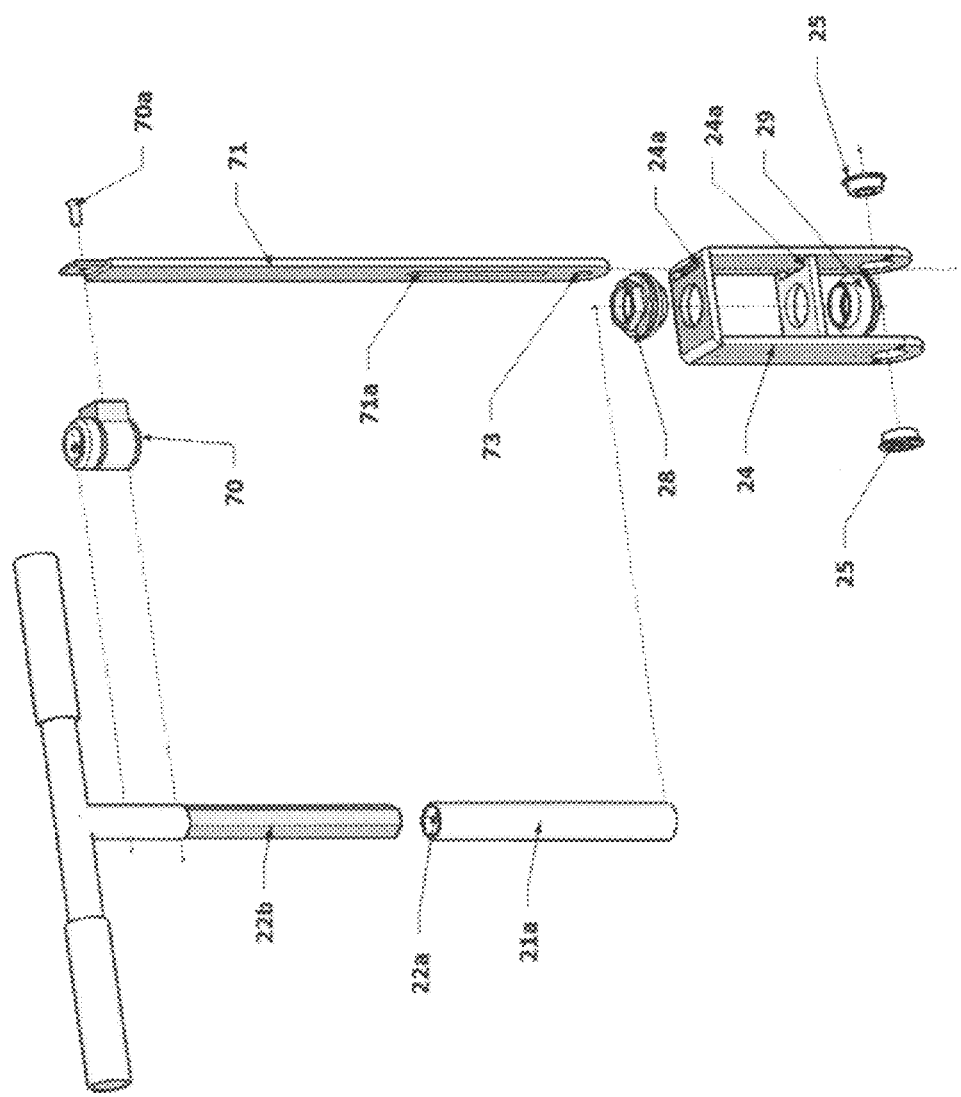

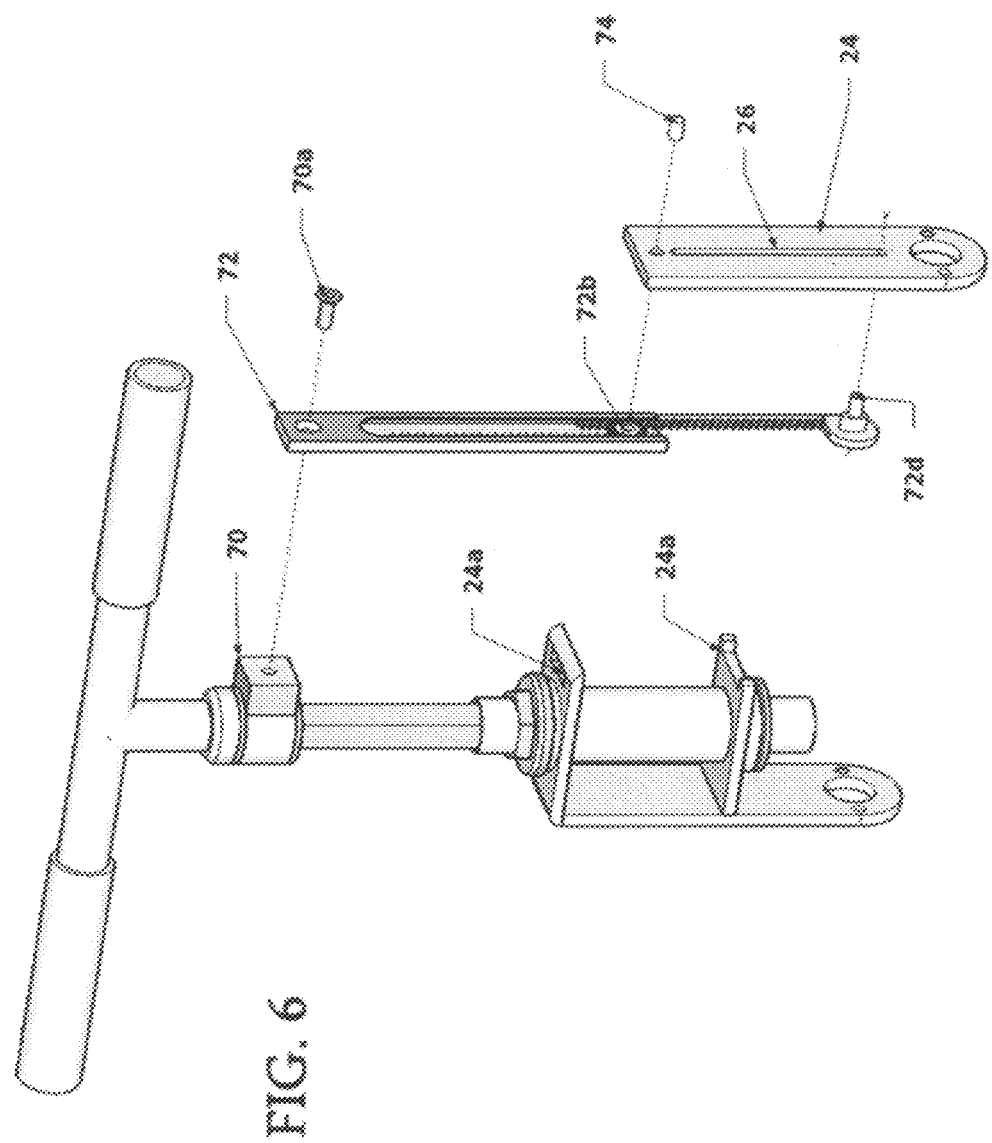

X9-pedal assembly

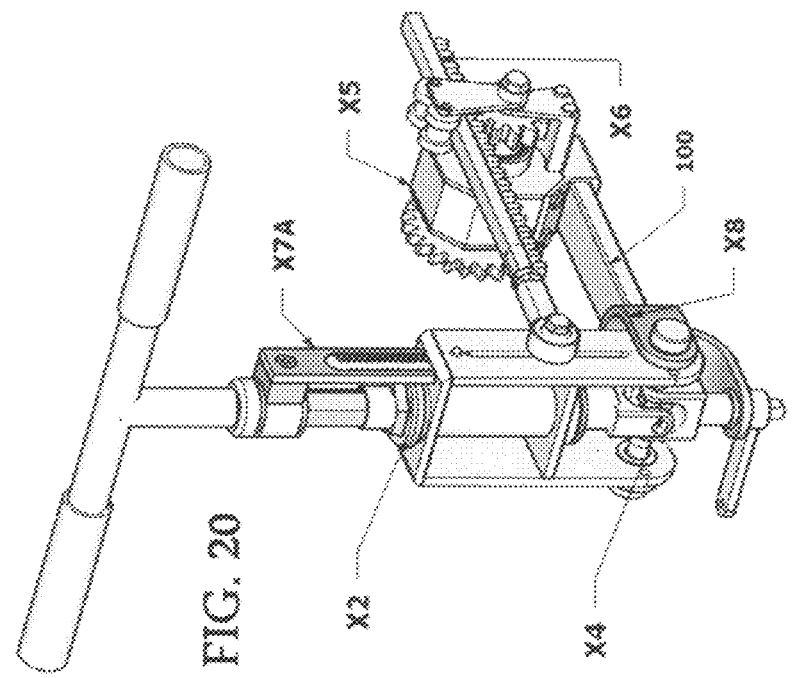
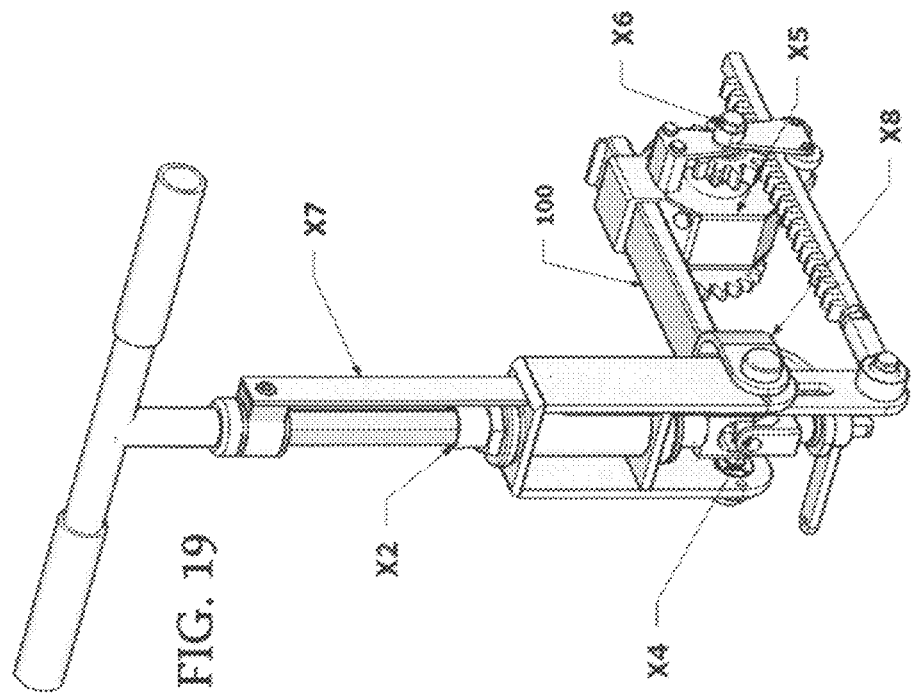

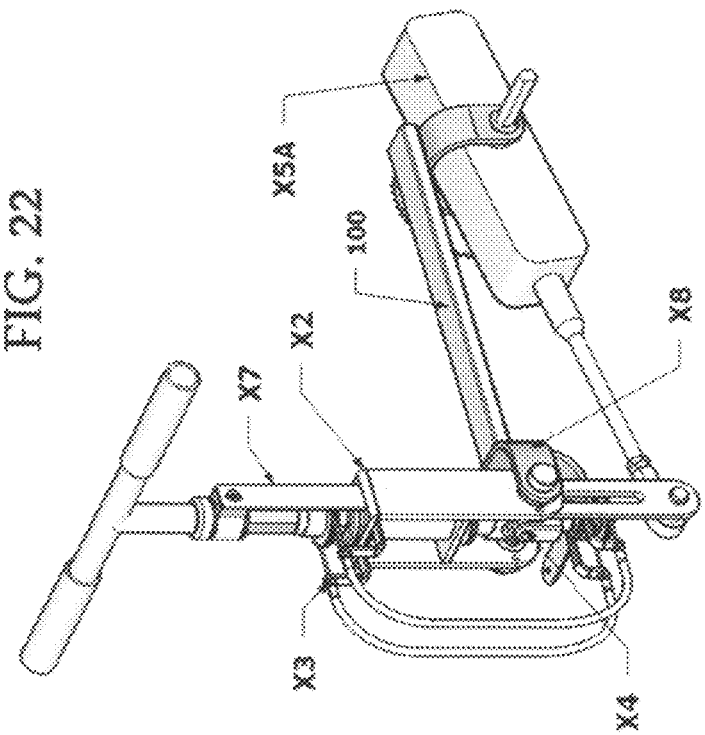
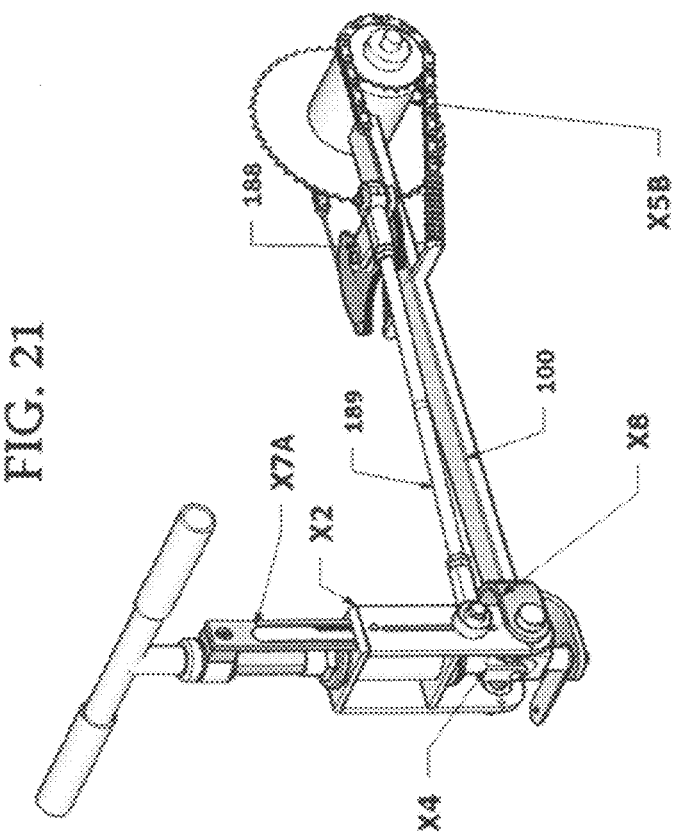

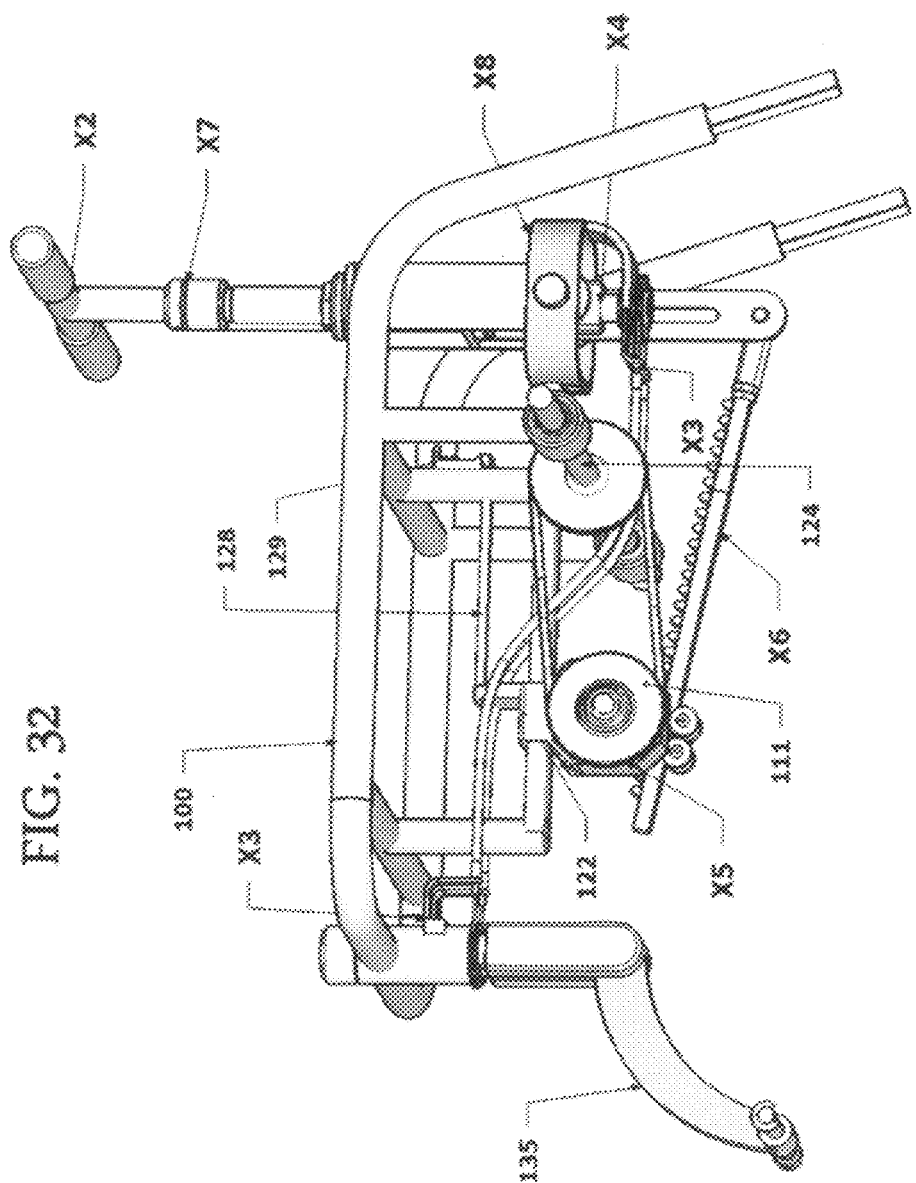

HUMAN PROPULSION SYSTEM

BACKGROUND OF INVENTION

1. Field of Invention

The invention relates to human propulsion systems that can be operated by the arms and or legs of an operator to provide a means of powering and controlling other mechanisms including exercise equipment, rehabilitation equipment, wheelchairs and vehicles.

2. Description of Prior Art

The embodiments disclosed enable the making and the using of a human powered vehicle that overcomes the undesirable characteristics of earlier recumbent vehicles.

The unsuitability of such a vehicle for individuals having impaired leg function is apparent. The provisions of the present embodiment to be powered by the operators arms and or legs enables the application of greater motive force and the ability to provide power while resting the operators arms or legs. Further, it is designed to compact and simple and versatile by offering multiple components that can be employed as a whole or alternatively so as to fit many different mechanisms designs.

Earlier vehicles have limited utility compared to the present embodiment. A variety of converter systems have been developed in the past for bicycles, tricycles, hand-cycles in various designs including recumbent style human powered vehicles etc. While most mainly employ only a traditional pedal crank drive commonly found on bicycles there are some that employ levers to be reciprocated for and aft either with ratchet systems that only propels the vehicle in one direction of the lever movement. Others arm lever systems have achieved the ability to propel their vehicle forward in both for and aft reciprocal movements through ratchet mechanisms and clutch and gear systems. There are even some vehicles that are propelled by hand and foot operation.

Liebert in U.S. Pat. No. 5,383,675 combines hand and foot operation in a versatile system that can incorporated into different embodiments that claims to allow an operator to propel on land, water and air. The invention relies on reciprocating movements of both hand and foot that are connected together and helmet to be worn that is linked to steering mechanism that activates by the movement of the operators head. Although very unique in design it has undesired limitation in that the arm and leg levers are linked together and does not allow the operator to use one or the other separately without removing his arms or legs from the corresponding levers further the head activated steering does not allow the operator to be able to look around without altering the path of the vehicle.

Bean in U.S. Pat. No. 6,572,129 combines hand and foot operation in a single embodiment that employs a conventional pedal assembly linked to the two arm lever assemblies by a spring loaded length of chain that wraps around a ratcheting free-wheel sprocket axially supported by the pedal assembly which only adds power on the reverse stroke of hand levers which is limited in means of efficiency. Further, although the pedal assembly can be utilized separate of the arm levers to propel the vehicle the same cannot be the for the arm levers, which activates the pedal assembly when utilized to propel the vehicle.

Bayne in U.S. Pat. No. 7,584,976 is a single lever operated trike design that propels the vehicle forward with both for and aft reciprocal movements of the arm lever. The converter system utilizes a plurality of chains and hubs supporting gears. The steering is activated through a cable system by rotating the arm lever left or right. Although unique in design it lacks in simplicity and compactness in design of the propulsion system and lacks the versatility to be employed into other vehicles and mechanisms, and the ability to incorporate the use of an operators legs.

Schaeffer in U.S. Pat. No. 6,715,780 B2 is human powered wheelchair system that combines at least one arm lever connect to a propulsion system that utilizing gears and clutches to convert the fore and aft movements of the arm lever into a unidirectional rotation linked to a shifting hub to be linked to a driven wheel. Although, it lacks the ability to utilized in anything other than a wheelchair and does not offer a method for steering other than the braking system. Further, it needs to utilize two of the propulsion systems and two gear boxes which can be expensive to produce and cumbersome in design.

BRIEF SUMMARY OF THE INVENTION

The invention disclosed enables the making and the use of a human-propulsion-system that overcomes the undesirable characteristics of earlier propulsion systems.

The human-propulsion-system according to the present disclosure is designed to have sufficient versatility that can be used successfully by many different individuals, each of whom has different needs and capabilities and can be incorporated for both utilitarian and recreational purposes. It can be operatively utilized by or incorporated into many different mechanisms including, but not limited to, rehabilitation apparatuses, exercise equipment, wheelchairs and human powered vehicles.

The human-propulsion-system comprises of a telescoping, "T" shaped, arm lever assembly that is reciprocated and pivoted right and left by an operator. The arm lever assembly is reciprocated for a means of propulsion and is operatively connected to a converter that receives the reciprocating movements and converts then into a unidirectional rotation of an output link to be operatively linked to propel the different mechanisms.

Because the invention is designed to be versatile it offers a variety of options wherein; there are two versions of a controller to be utilized by the arm lever assembly by corresponding with the right and left rotational movements of the arm lever to provide the operator with a means of control of a function of the different mechanisms such as steering.

The arm lever assembly utilizes a slide mechanism that correspondingly changes the distance of the load point from the fulcrum point when the arm lever is extended or retracted offering a range of leverages. Example: when the arm lever assembly is retracted the load point correspondingly moves farther away from the fulcrum point and when the arm lever assembly is extended the load point moves closer to the fulcrum point.

Further there is an optional foot pedal assembly that can be rigidly attached to front of the support mechanism and operatively linked to the converter to offer the operator the ability to add leg power to the propulsion system.

Additional objects, advantages, and other novel features of the invention will be set forth in the detailed description that follows with reference to the accompanying drawings, and will become apparent to those skilled in the art upon examination of the following, or will be learned with the practice of the invention. The objects and advantages may be realized and obtained by means of the instrumentalities and combinations particularly pointed out in the appending claims.

BRIEF DESCRIPTION OF THE SEVERAL VIEWS OF THE DRAWING

FIG. 2 is an isometric view of arm lever assembly (X2) and the class 1 slide (X7) exploded.

FIG. 6 is an isometric view of arm lever assembly (X2) and the class 2 slide (X7A) exploded.

FIG. 19 is an isometric view of the arm lever assembly (X2) utilizing the class 1 slide (X7), the u-joint controller (X4), the rack link (X6), and the bevel gear converter (X5).

FIG. 20 is an isometric view of the arm lever assembly (X2) utilizing the class 2 slide (X7A), the u-joint controller (X4), the rack link (X6), and the bevel gear converter (X5).

FIG. 21 is an isometric view of the arm lever assembly (X2) utilizing the class 2 slide (X7A), the u-joint controller (X4) and the ratchet drive converter (X5B).

FIG. 22 is an isometric view of the arm lever assembly (X2) utilizing the class 1 slide (X7), the u-joint controller (X4), the cable controller (X3) and the rack drive converter (X5B).

FIG. 32 is an isometric view of the rear steer wheelchair utilizing the arm lever assembly (X2), the class 1 slide (X7), the u-joint controller (X4), the cable controller (X3), the rack link (X6), and the bevel gear converter (X5).

DETAILED DESCRIPTION OF THE INVENTION

Reference will now be made to the preferred embodiment of the invention, the example of which is illustrated in the accompanying drawings. As required, detailed embodiments of the invention are disclosed herein; however, details to the function, shape, dimensions, materials, methods of fastening, methods of attaching, methods of fixing and structures of the components of the invention are not meant to be interpreted as limiting, but rather a basis for the claims of the invention and to educate one skilled in the art to employ the invention in virtually any structure.

Figure 1:
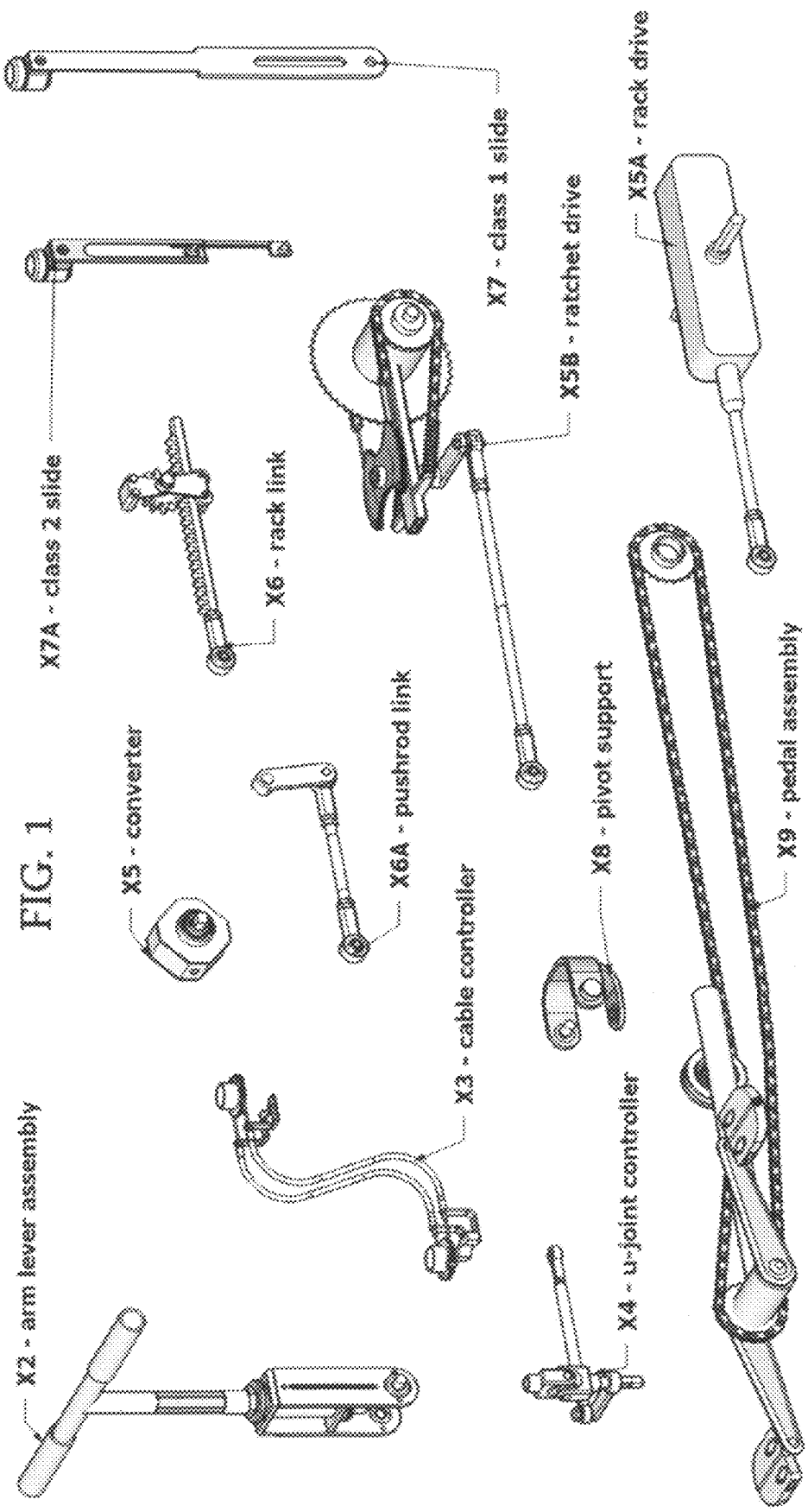
FIG. 1 is an isometric view referencing various components utilizing in the invention.

Referring now to FIG. 1 is an isometric view of multiple components that are claimed and numbered starting with an "X". There is shown the arm lever assembly (X2), the cable controller (X3), the u-joint controller (X4), the bevel gear converter (X5), the rack drive converter (X5A), the ratchet drive converter (X5B), the rack link (X6), the pushrod link (X6A), the class 1 slide (X7), the class 2 slide (X7A), the pivot support (X8) and the pedal assembly (X9).

Referring now to FIG. 2, there is illustrated the arm lever assembly (X2) and the class 1 slide (X7) exploded wherein the upper section (21b) is "T" shaped with a male shape portion (22b) on the O.D. The lower section (21a) has a female shape portion (22a) on the I.D. that correspondingly slip fits around the O.D. of the male shape portion (22b) that allows the upper section (21b) to be telescopically free while maintaining rotational unity.

The reciprocating member (24) is fitted with the bearings (25) at the fulcrum point. The lower bearing (29) is fitted into the bottom end of the reciprocating member (24) and the upper bearing (28), having a lock collar, is fitted into the top of the reciprocating member (24). The lower section (21a) is rotationally supported by the lower bearing (29) and the upper bearing (28) and further held in place by the lock collar of the upper bearing (28). The slide (71) is fastened to the rotary collar (70) with the fastener (70a) and is supported by the reciprocating member (24) linearly free by sliding through the slots (24a). The rotary collar (70) comprises of a bearing with a lock collar supported about the O.D. of the upper section (21b), which causes the slide to correspondingly move up and down when the upper section (21b) is extended and retracted, further allowing the upper section (21b) to be rotated without causing the slide (71) to rotate. The load point (73) is where the converters are linked.

Figure 3:
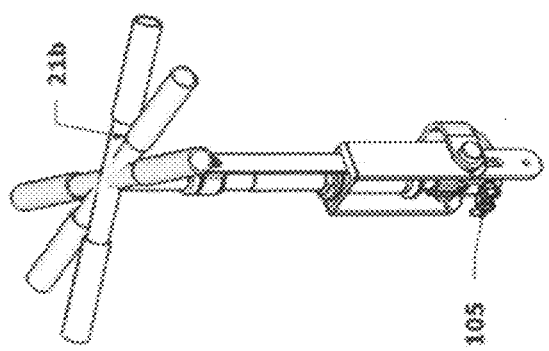
FIG. 3 is an isometric view illustrating the corresponding rotational movements of the arm lever assembly (X2) with the u-joint controller (X4).

Referring now to FIG. 3, illustrates the rotational movements of the arm lever assembly (X2) and the corresponding movements of the u-joint controller (X4). When the arm lever assembly (X2) is rotated left or right it correspondingly rotates the u-joint controller (X4).

Figure 4:
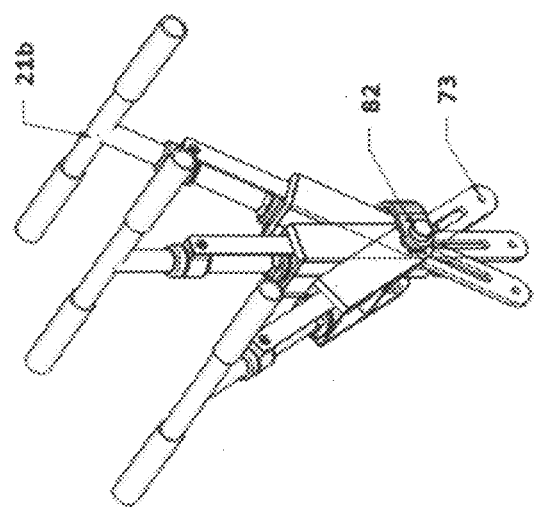
FIG. 4 is an isometric view illustrating the reciprocating movements of the arm lever assembly (X2).

Referring now to FIG. 4 illustrates the reciprocating movement of the arm lever assembly (X2) pivoting upon the pivot pins (82) and the corresponding movement of the load point (73).

Figure 5:
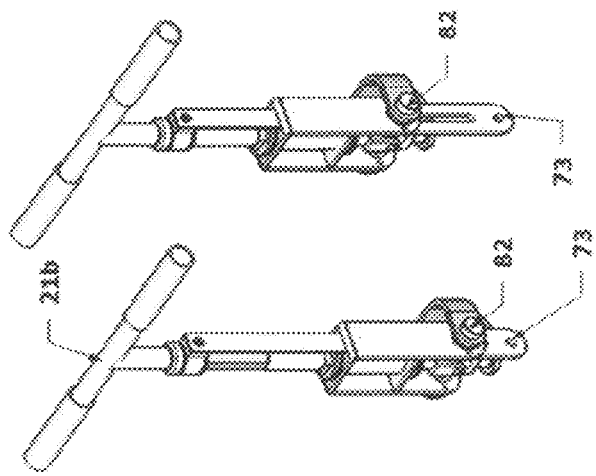
FIG. 5 is an isometric view illustrating the corresponding movement of the class 1 slide (X7) with the telescoping action of the upper section (21b).

Referring now to FIG. 5 which illustrates the corresponding movement of the class 1 slide (X7) in relation to the linear movements of the upper section (21b) when being extended and retracted. The drawing on the left illustrates when the upper section (21b) is retracted, the force end get closer to the pivot pin (82), while the load point (73) correspondingly gets further away from the pivot pin (82). The drawing on the right illustrates when the upper section (21b) is extended, the force end get farther away from pivot pin (82), while the load point (73) correspondingly gets closer to pivot pin (82).

Referring now to FIG. 6, there is illustrated the class 2 slide (X7A) and how it is supported by the arm lever assembly (X2). The rack slide (72) is fastened to the rotary collar (70) with the fastener (70a), further being supported, linearly free, through the slots (24a). The pinion gear (72b) is support, rotationally free, by the pinion pin (74) attached to the side of the reciprocating member (24). The load pin (72d) slides up and down in the slot (26) and connects to the converters.

Figure 7:
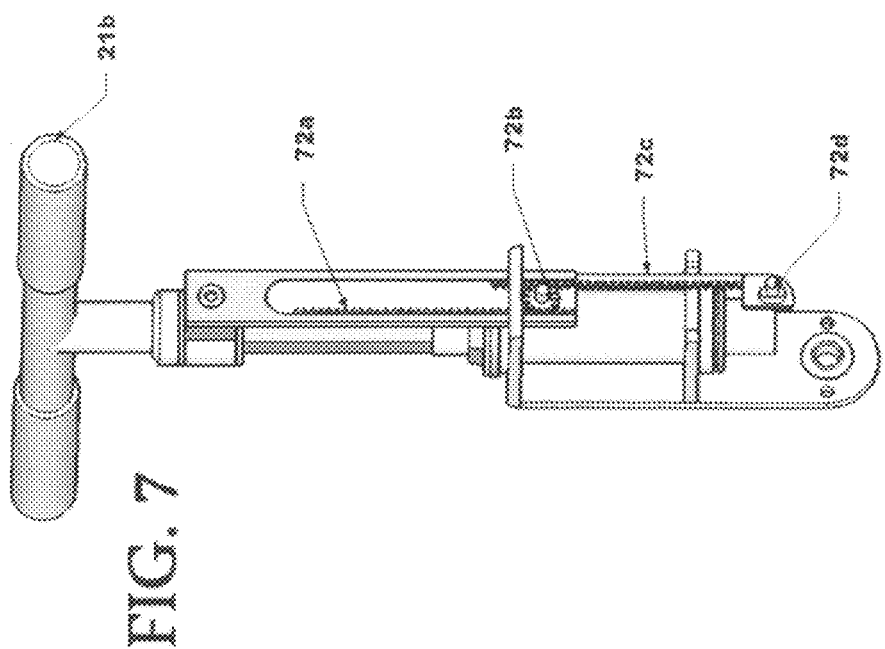
FIG. 7 is an isometric view of arm lever assembly (X2) and the class 2 slide (X7A) extended.

Referring now to FIG. 7, there is illustrated the class 2 slide (X7A) extended wherein the upper section (21b) is extended it pulls up on the upper rack (72a) causing the pinion gear (72b) to rotated which causes the lower rack (72c) to extend downward forcing the load pin (72d) closer to the fulcrum point.

Figure 8:
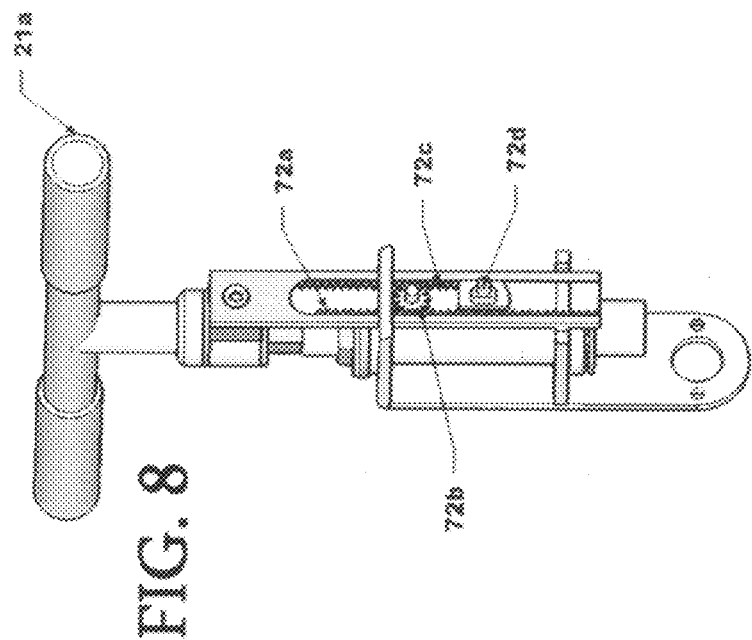
FIG. 8 is an isometric view of arm lever assembly (X2) and the class 2 slide (X7A) retracted.

Referring now to FIG. 8 there is illustrated the class 2 slide (X7A) retracted wherein the upper section (21b) is retracted it pushes down on the upper rack (72a) causing the pinion gear (72b) to rotated which causes the lower rack (72c) to retract upward forcing the load pin (72d) farther from the fulcrum point.

Figure 9:
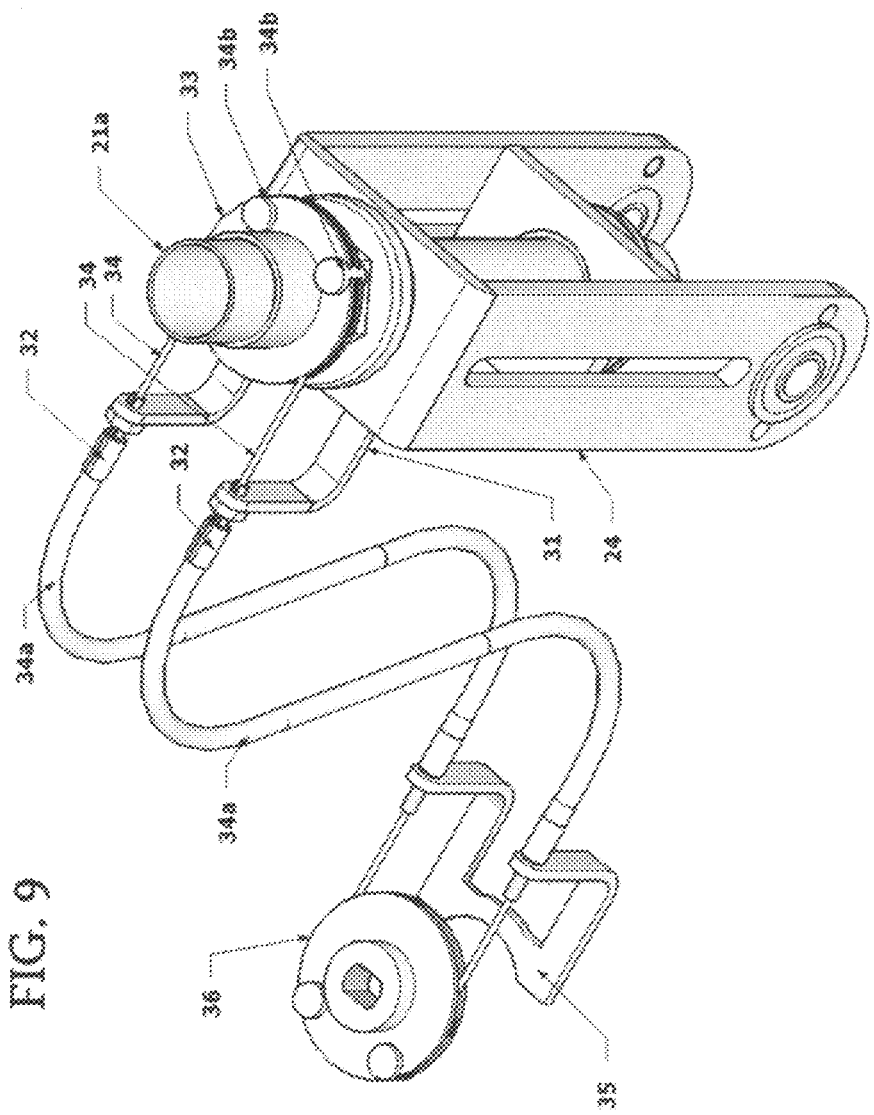
FIG. 9 is an isometric view of cable controller (X3) assembled on the arm lever assembly (X2).

Referring now to FIG. 9, is an isometric view illustrating the method of support of the cable controller (X3) on the arm lever assembly (X2) wherein the rotary member (33) is fixed around the O.D. of the lower section (21a) and supports one barrel end (34b) of each cable (34). One end, of each the cable housings (34a) is supported by a cable tension adjuster (32) that is threaded into a corresponding hole in the cable retainer (31) and the opposite ends of the cable housings (34a) are supported by the mountable cable retainer (35) that is fixed to either the pivot support (X8) or any other desired location. The rotary receiver (36) supports the opposite ends of the cables (34) and the cable retainer (31) is fixed to the reciprocating member (24). When the lower section (21a) is rotated left or right is correspondingly rotates the rotary member (33) pulling on one of the cables (34) correspondingly rotating the rotary receiver (36).

Figure 10:
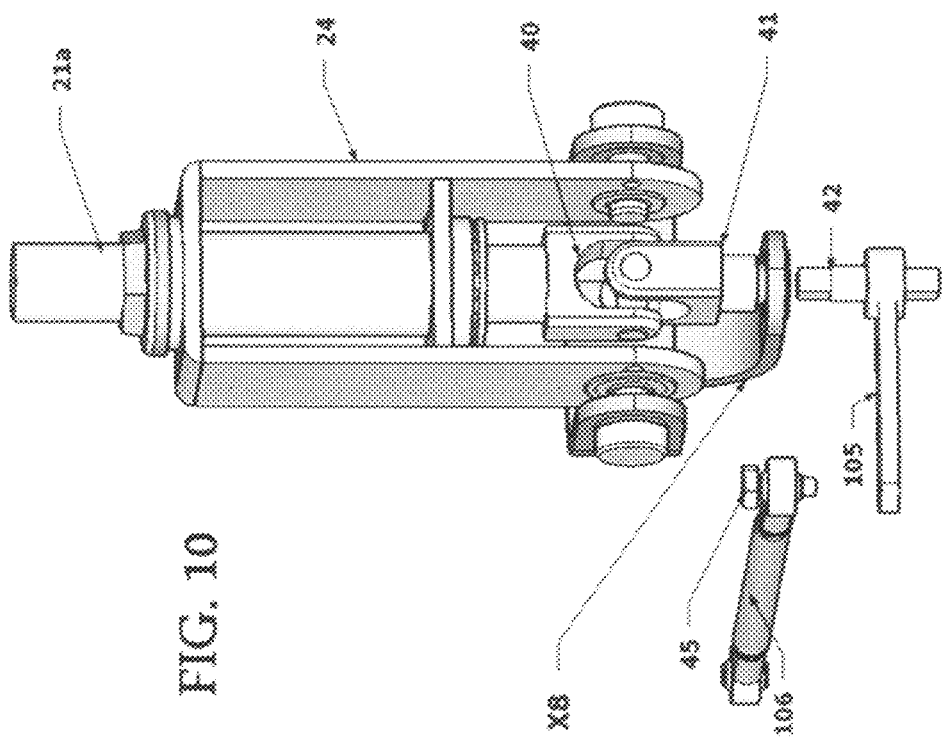
FIG. 10 is an isometric view of u-joint controller (X4) supported by the arm lever assembly (X2) partially exploded.

Referring now to FIG. 10 there is illustrated the u-joint controller (X4) supported by the reciprocating member (24). The upper half (40) of the universal joint is fixed to the bottom of the lower section (21a). The stub shaft (42) is pivotally supported through the bottom of the pivot support (X8) and rotationally connecting the lower half (41) and the pitman arm (105). The tie rod (106), having a pivot joint at each end, is attached by one end to the pitman arm (105) by the fastener (45) and attached by the opposite end to a function of the support mechanism in need of control.

Figure 11:
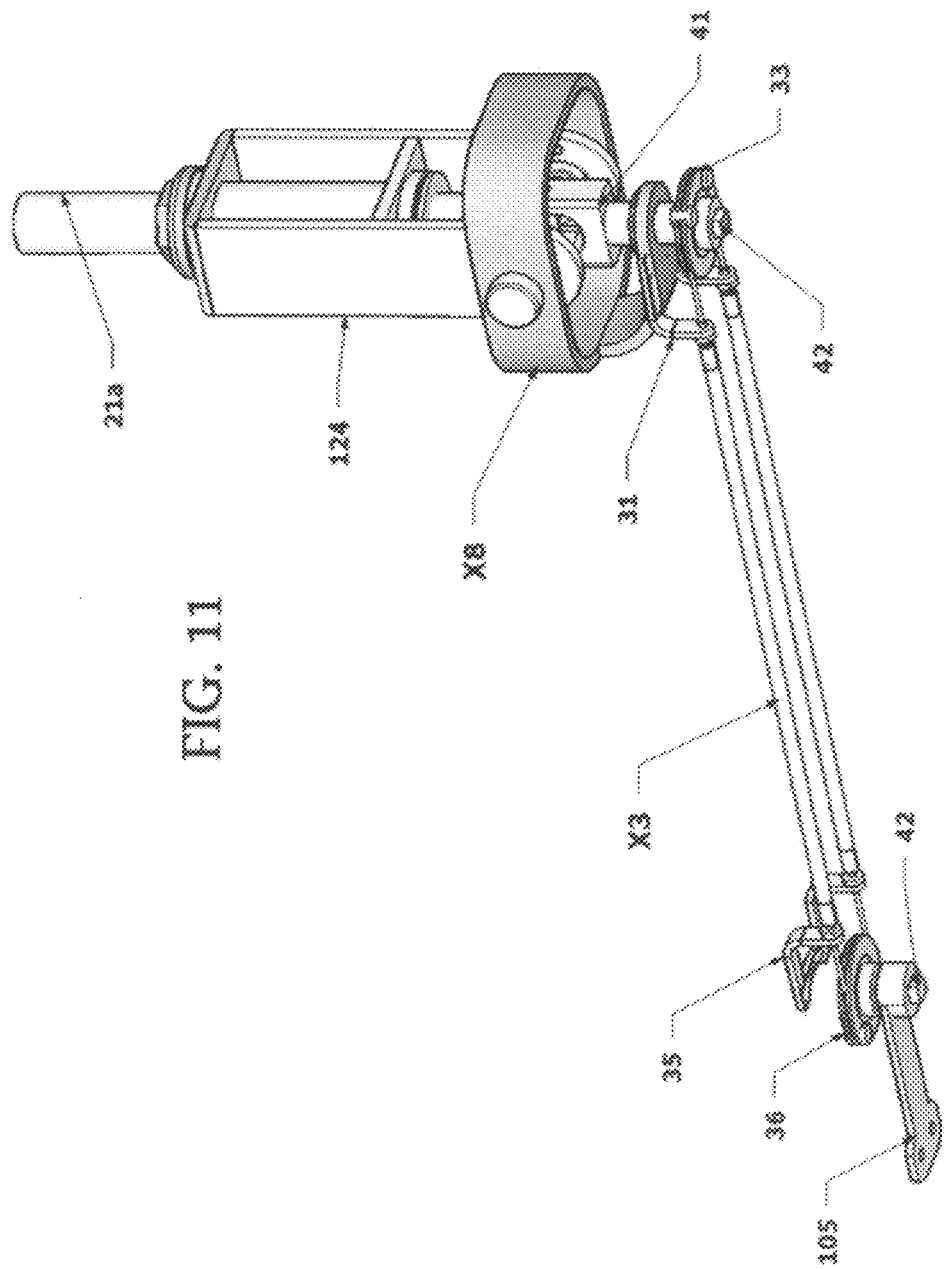
FIG. 11 is an isometric view of u-joint controller (X4) and the cable controller (X3) supported by the arm lever assembly (X2).

Referring now to FIG. 11, illustrates the ability of the arm lever assembly (X2) and the pivot support (X8) to support the cable controller (X3) and the u-joint controller (X4). The stub shaft (42) is pivotally supported through the bottom of the pivot support (X8) and rotationally connecting the lower half (41) to the rotary member (33). The cable retainer (31) is fixed to the pivot support (X8) and the mountable cable retainer (35) and the rotary receiver (36) are operatively supported by the support mechanism. A second stub shaft (42) can be used when the pitman arm (105) needs to be attached to the rotary receiver (36).

Figure 12:
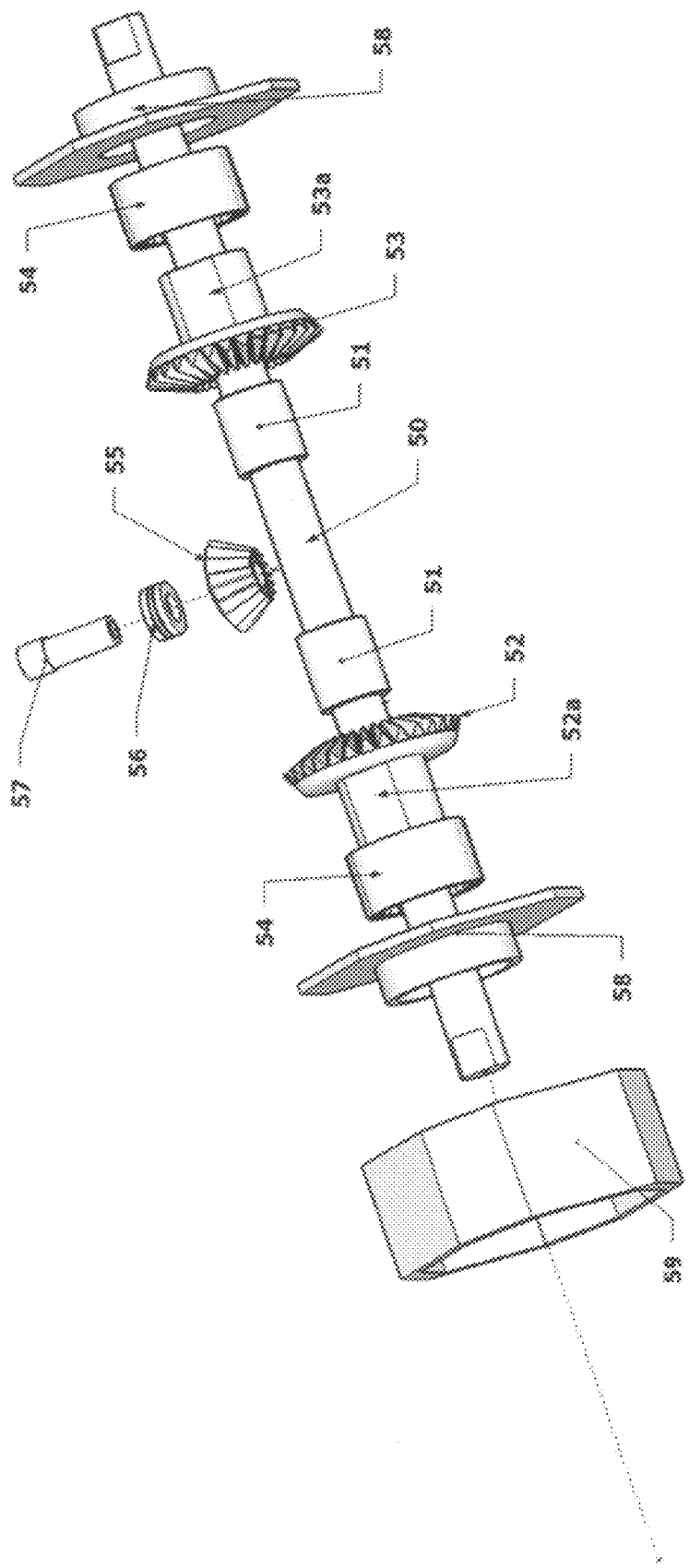
FIG. 12 is an isometric view of the bevel gear converter (X5) exploded.

Referring now to FIG. 12, there is illustrated the bevel gear converter (X5) exploded. In this illustration the common shaft (50) is shown lengthened for further explanation of the components and how the rotational engagement of the clutches (51) in each of the outer gears (52 & 53) can determine whether the common shaft (50), having "D" cuts on both ends, is utilized as an input end or an output end.

Each of the outer gears (52 & 53) has an extended hub (52a & 53a) with a "D" cut on the O.D. Each of the extended hubs (52a & 53a) axially supports at least one bearing (54) capable of both radial and thrust loads. Further each of the outer gears (52 & 53) has a bored center that is operatively fitted with at least one clutch (51) coaxially supported by the common shaft (50). There is at least one idler gear (55) that is backed by a thrust bearing (56) and axially supported by the stub shaft (57) further arranged right angle of the outer gears (52 & 53) and properly intermeshed between them. The stub shaft (57) is fixed to the inside of the middle housing section (59) and each of the housing end caps (58) is axially supported on the O.D. of opposite bearings (54).

When the common shaft (50) is utilized as an input end the at least one clutch (51) operatively fitted by each of the outer gears (52 & 53) must engage in opposite rotations of the common shaft (50) and at least one of the extended hubs (52a & 53a) of the outer gears (52 & 53) is to be utilized as the output end. In this arrangement the common shaft (50) receives reciprocating movements from the rack pushrod wherein forward rotational direction of the common shaft (50) engages one of the outer gears (52 & 53) and the reverse rotation of the common shaft (50) engages the opposite of the outer gears (52 & 53) because they are intermeshed by the idler gear (55) they both maintain an opposite unidirectional rotation.

When the common shaft (50) is alternatively utilized as an output end the at least one clutch (51) operatively fitted by each of the outer gears (52 & 53) must be arranged to engage in the same rotational direction. In this arrangement at least one of the outer gears (52 & 53) receives reciprocating movements, and because they are intermeshed by the idler gear (55) each outer gears (52 & 53) takes turns engaging the common shaft (50) in unidirectional rotation.

Figure 13:
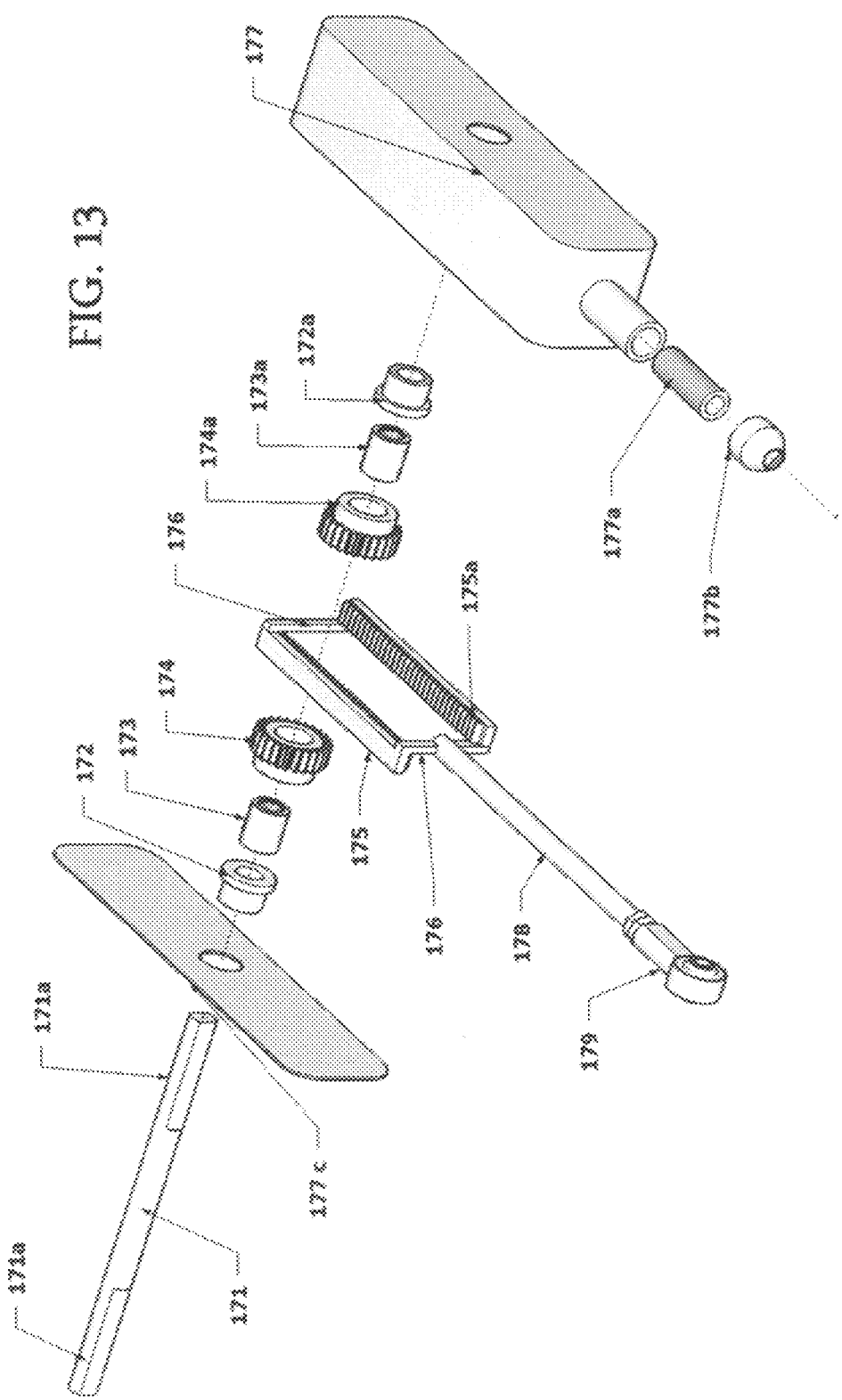
FIG. 13 is an isometric view of the rack drive converter (X5A) exploded.

Referring now to FIG. 13, there is illustrated the rack drive converter (X5A) exploded, wherein clutch (173) is fitted into the bore of the spur gear (174) and corresponds with rack gear (175), clutch (173a) is fitted into the bore of spur gear (174a) and corresponds with rack gear (175a), braces (176) connect the ends of the rack gears (175 & 175a) to form a rack gear unit. The bearing (172a) is fitted into the corresponding bore in the housing (177) and bearing (172) is fitted into the corresponding bore in the access panel (177c). The axle (171) is supported by the bearings (172) and (172a), and the pushrod (178), having a pivot joint (179) on one end, is attached by the opposite end to a brace (176). The pivot joint (179) is connected to the load point (73) of the arm lever assembly (X2). When operator reciprocates the arm lever assembly (X2) it pushes and pulls the pushrod (178) correspondingly pushing and pulling the rack gears (175 & 175a) wherein the rack gear (175) is pulled forward it spins spur gear (174) forward engaging the axle (171) forward, when the rack gear (174a) is pushed backward it rotates spur gear (174a) forward engaging the axle forward. The linear bearing (177a) linearly supports the pushrod (178) and the rubber cap (177b) prevents debris from getting in the housing (177) area.

Figure 14:
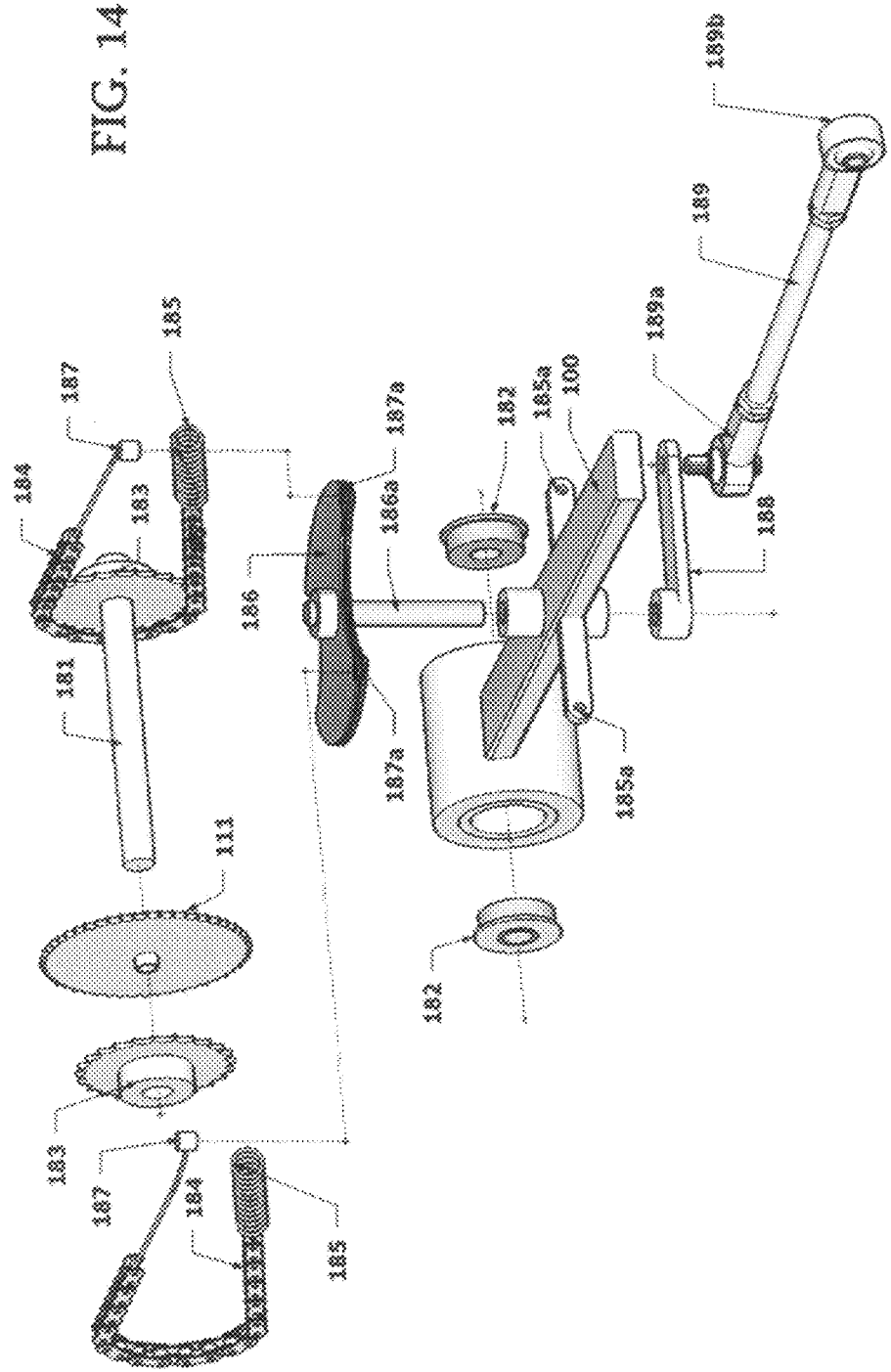
FIG. 14 is an isometric view of the ratchet drive converter (X5B) exploded.

Referring now to FIG. 14, there is illustrated the ratchet drive converter (X5B) exploded wherein the bearings (182) are fitted into the corresponding bores in the frame (100). The common shaft (181) is rotationally supported by the bearings (182). The ratchet sprockets (183) are fastened on opposite ends of the common shaft (181) and arranged to engage the common shaft (181) in the same rotational direction. The vertical shaft (186a) is supported, rotationally free, by the corresponding bore in the frame (100) and fitted with the idler bracket (186). The crank arm (188) can be attached to the vertical shaft (186a) at either the top or bottom end, for the best function of the ratchet drive it would be desirable to mount it on the end that keeps the pushrod (189) as level as possible with the idler bracket (186). Each of the chains (184) is attached by one end to a spring (185) that attaches to opposite tabs (185a) on the frame (100). The other end of each chain (184) is attached to one end of a length of cable (187), and the opposite end of each cable (187) has a barrel end that corresponds with a barrel hole (187a) in the idler bracket (186). Pivot joint (189a) is pivotally attached to the crank arm (188) and the pivot joint (189b) is pivotally attached to the load point (73).

When the arm lever assembly (X2) is reciprocated the pushrod (189) pivots the crank arm (188) back and forth wherein the idler bracket (186) correspondingly pivots alternately pulling on a cable (187) in both the for and aft movements pulling the corresponding chain (184) rotating the corresponding ratchet sprocket (183) forward which engages the common shaft (181) in a desired unidirectional rotation.

Figure 15:
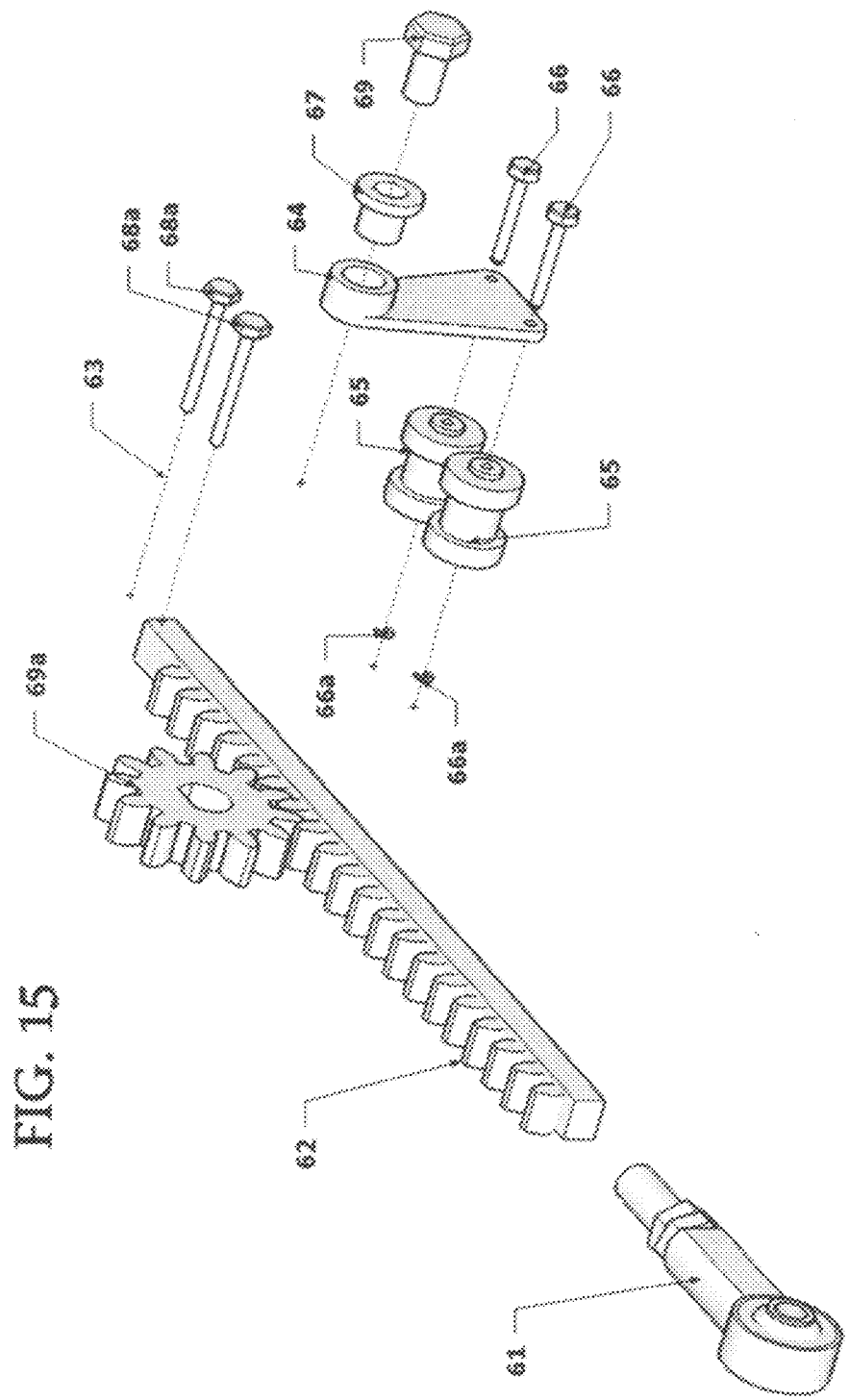
FIG. 15 is an isometric view of the rack link (X6) exploded.

Referring now to FIG. 15, illustrates the rack link exploded comprising a length of rack gear (62) with a pivot joint (61) fastened at one end. An input gear (69a) is axially fixed to the input end of the converter and a pushrod guide (65) maintains proper contact between rack gear (62) and the input gear (69a) during reciprocation. Pushrod guide comprising: an upper guide support (63) is fastened to the converter (X5) by fasteners (68a), a lower guide support (64) is fitted with bearing (67) and is pivotally supported axially by the pivot pin (69) that is fixed to upper guide support (63). The two pushrod guides (65) fitted with bearings are supported rotationally free on the pins (66) that are retained in the lower guide support (64) by the pin clips (66a). The pivot pin (69) is located at the same axis point as the common shaft (50).

Figure 16:
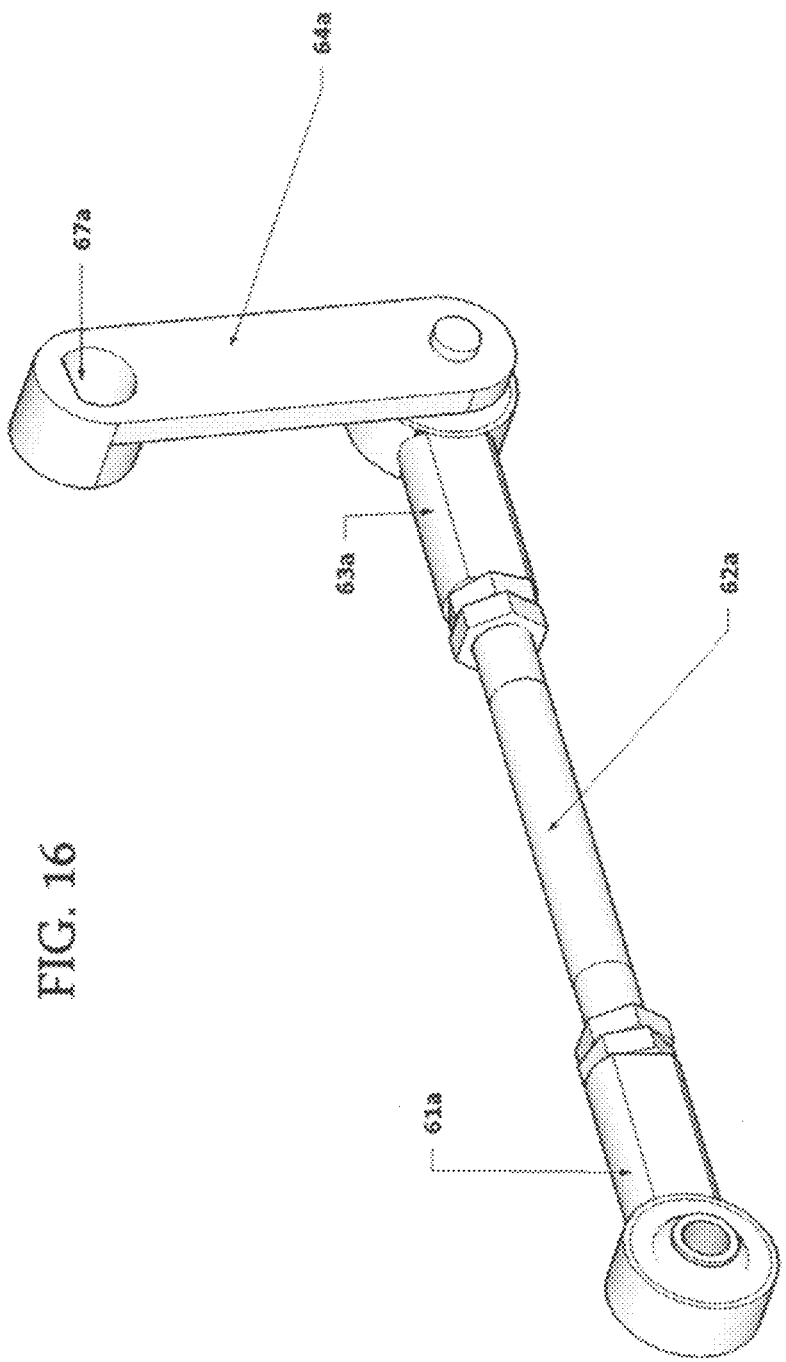
FIG. 16 is an isometric view of the pushrod link (X6A).

Referring now to FIG. 16 of the pushrod link (X6A). The length of rod (62a) has a pivot joint (61a) on one end that pivotally connects to the reciprocating member (24). The pivot joint (63a) on the opposite end of the rod (62a) pivotally connects to the lever (64a) and the "D" bore (67a) is axially fixed a corresponding cut on the input end.

Figure 17:
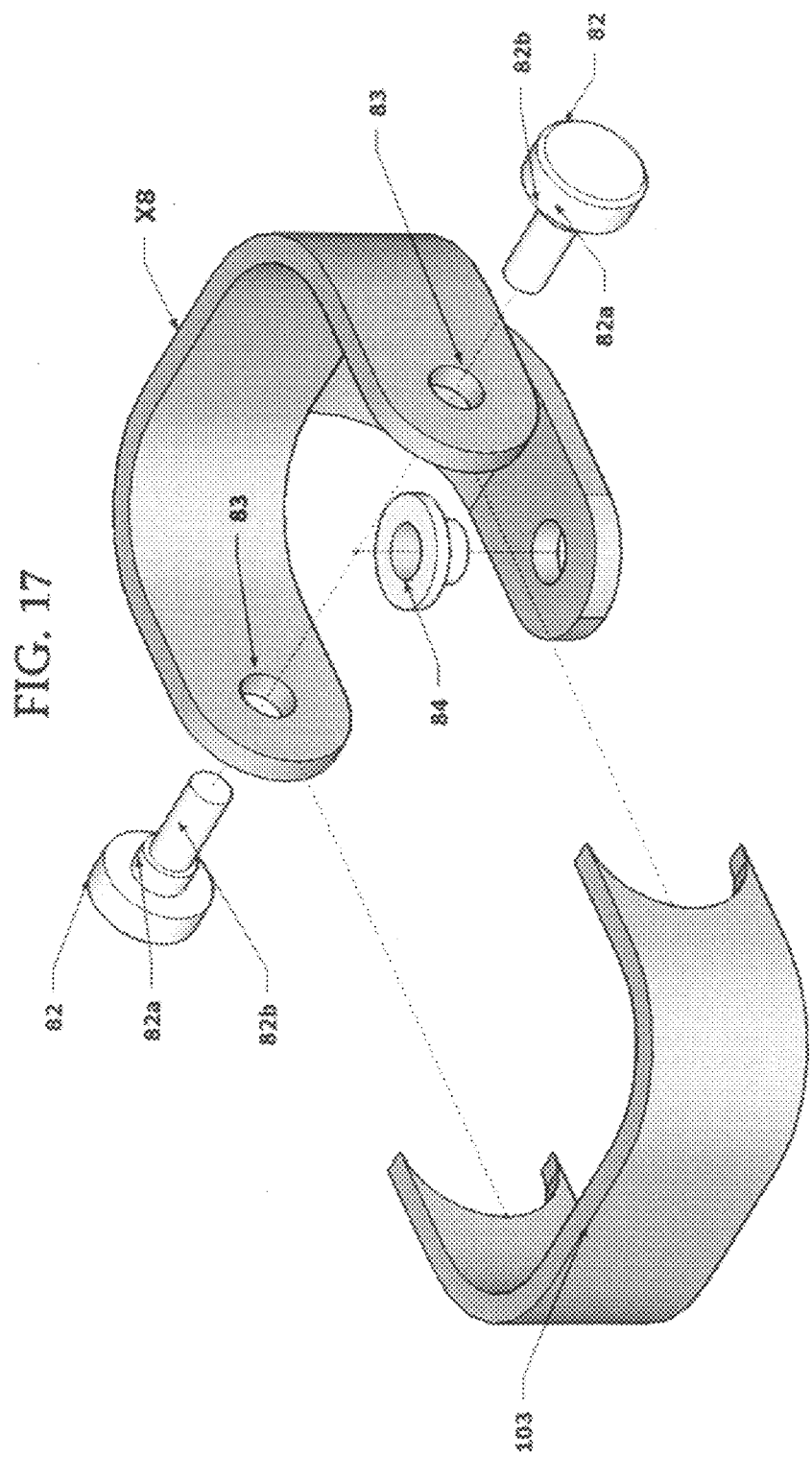
FIG. 17 is an isometric view of pivot support (X8) exploded.

Referring now to FIG. 17, there is illustrated the pivot support (X8) exploded wherein the pivot pins (82) pivotally support the arm lever assembly (X2) at the fulcrum point. The pivot pins (82) have two sections wherein one section is the treaded section (82a) that threads into the corresponding threaded holes (83), and the bearing section (82b) supports the bearings (25) (see FIG. 2). The bearing (84) is fitted into the corresponding hole in the pivot support (X8) and pivotally supports the stub shaft (42) (see FIG. 4).

Figure 18:
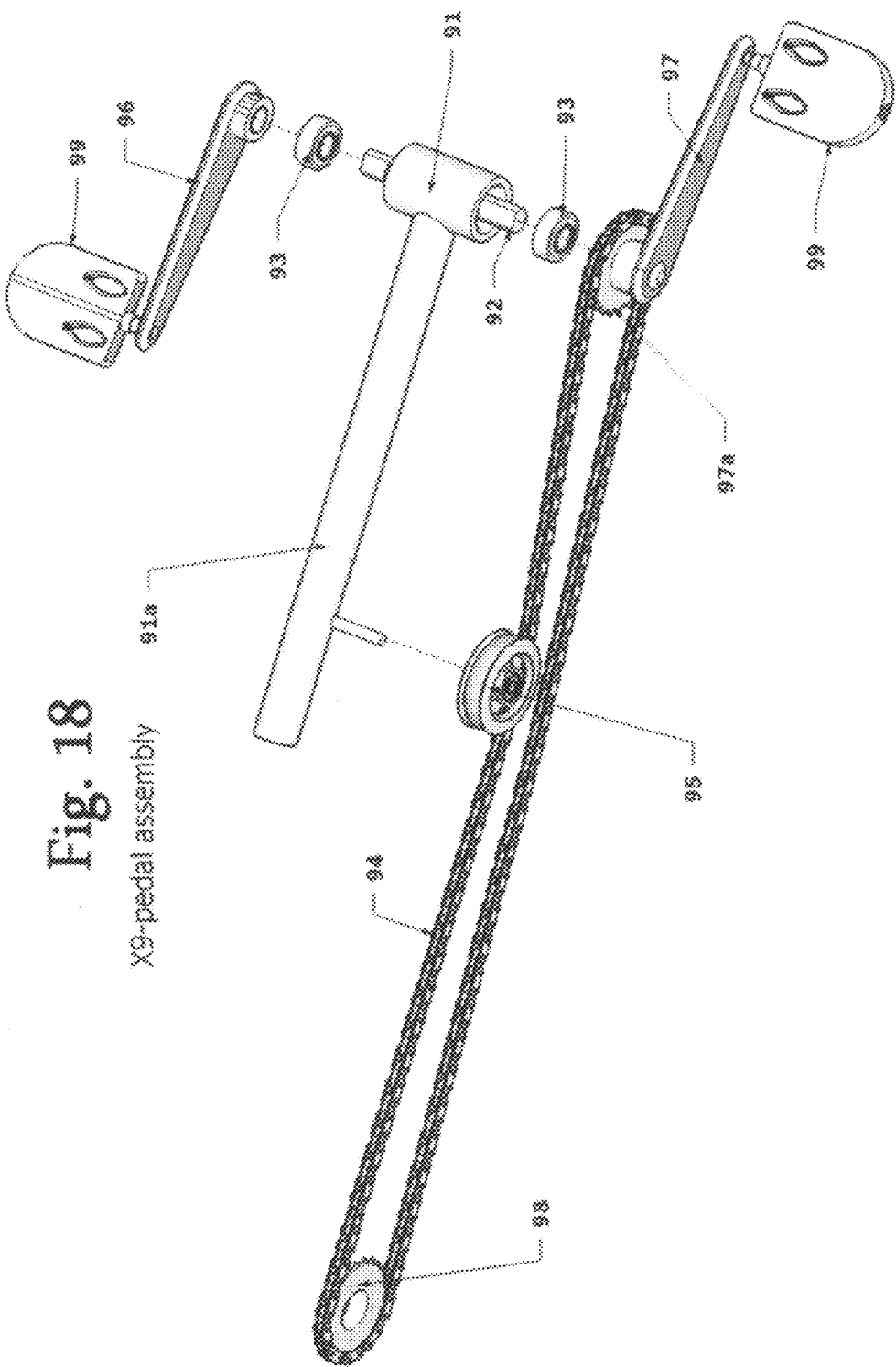
FIG. 18 is an isometric view of the pedal assembly (X9) exploded.

Referring now to FIG. 18 of the pedal assembly (X9) exploded. The axle (92) is rotationally supported by the axle bearings (93) that are fitted into each end of the bottom bracket (91). The crank arm (96) supports a pedal (99) rotationally free and the crank arm (97) fixed with the sprocket (97a) supports a pedal (99) rotationally free further, both the crank arm (96) and crank arm (97) are connected to opposite ends of the axle (92). The chain guide (95) is fixed to the extension (91a) that is fixed by one end to the bottom bracket (91) and fixed by the opposite end to the support mechanism forward of the operator. The chain (94) links the sprocket (97a) to the free-wheel sprocket (98) that fixes to the output end of the converter (X5).

Referring now to FIG. 19, there is illustrated one possible arrangement of different components wherein the arm lever assembly (X2) utilizing the class 1 slide (X7) and the u-joint controller (X4) are pivotally supported by the pivot support (X8). The bevel gear converter (X5) is supported by and below the frame (100), further is linked to the class 1 slide (X7) with the rack link (X6). The pushrod link (X6A) may be utilized instead of the rack link (X6) also the cable controller (X3) may also be utilized with or instead of the u-joint controller (X4).

Referring now to FIG. 20, there is illustrated one possible arrangement of different components wherein the arm lever assembly (X2) utilizing the class 2 slide (X7A) and the u-joint controller (X4) is pivotally supported by the pivot support (X8). The bevel gear converter (X5) is support by and above the frame (100), further is linked to the class 2 slide (X7A) with the rack link (X6). The pushrod link (X6A) may be utilized instead of the rack link (X6) also the cable controller (X3) may also be utilized with or instead of the u-joint controller (X4).

Referring now to FIG. 21, there is illustrated one possible arrangement of different components wherein the arm lever assembly (X2) utilizing the class 2 slide (X7A) and the u-joint controller (X4) is pivotally supported by the pivot support (X8). The ratchet drive converter (X5B) is supported by the frame (100), the crank arm (188) and the pushrod (189) are utilized above the frame (100) to maintain the best possible alignment with the class 2 slide (X7A), when the class 1 slide (X7) is utilized it would be best to connect the crank arm (188) and the pushrod (189) below the frame. With this arrangement the output of the ratchet drive converter (X5B) would rotate a wheel toward the arm lever assembly (X2), which is best used in rear wheel drive support mechanisms. However, when the ratchet drive converter (X5B) is desired in a front wheel drive support mechanism it would be recommended to utilize the ratchet drive converter (X5B) upside down, from what is shown, so the output end would rotate in a opposite direction. The cable controller (X3) may also be utilized with or instead of the u-joint controller (X4).

Referring now to FIG. 22, there is illustrated one possible arrangement of different components wherein the arm lever assembly (X2) utilizing the class 1 slide (X7), the cable controller (X3), and the u-joint controller (X4) is pivotally supported by the pivot support (X8). The rack drive converter (X5A) is pivotally supported by the frame (100) and connected to the class 1 slide (X7). When the class 2 slide (X7A) is used the rack drive converter (X5A) would align better if were supported above the frame (100).

Figure 23:
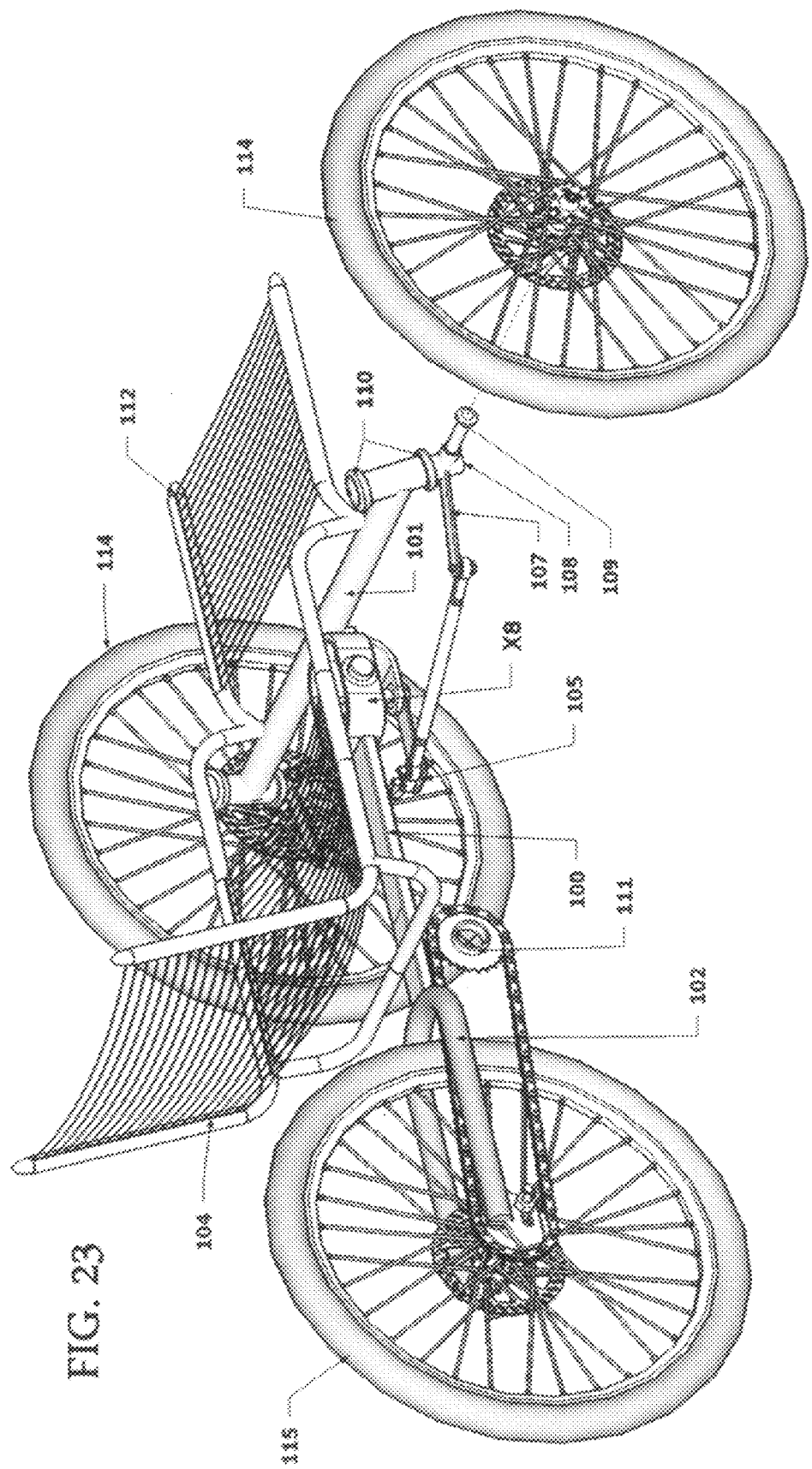
FIG. 23 is an isometric view of the vehicle support partially exploded.

Referring now to FIG. 23 of the front steer vehicle support. This version utilizes the leg support (112) where the operator's legs rest while sitting in the seat (104). The steerable wheels (114) are supported by the axles (109), rotationally free, and the axles (109) are attached to the kingpins (108), further the kingpins (108) are fixed with steering arms (107). The tie rods (106) pivotally connect the steering arms (107) to the pitman arm (105) that is pivotally supported by the pivot support (X8). The pitman arm (105) is connected to either the lower half (41) of the u-joint controller (X4), the rotary receiver (36) of the cable controller (X3) or both. The kingpins (108) are pivotally supported by the bearings (110) on both ends of the cross member (101). The cross member (101) is attached to the frame (100) forward of the pivot support (X8). The fork (102) attached to the frame (100) rear of the seat (104) supports the drive wheel (115), in an adjustable manner, allowing for limited back and forth adjustment to eliminate unwanted slack in the chain of the output link (111) that links the drive wheel (115) to the converter.

Figure 24:
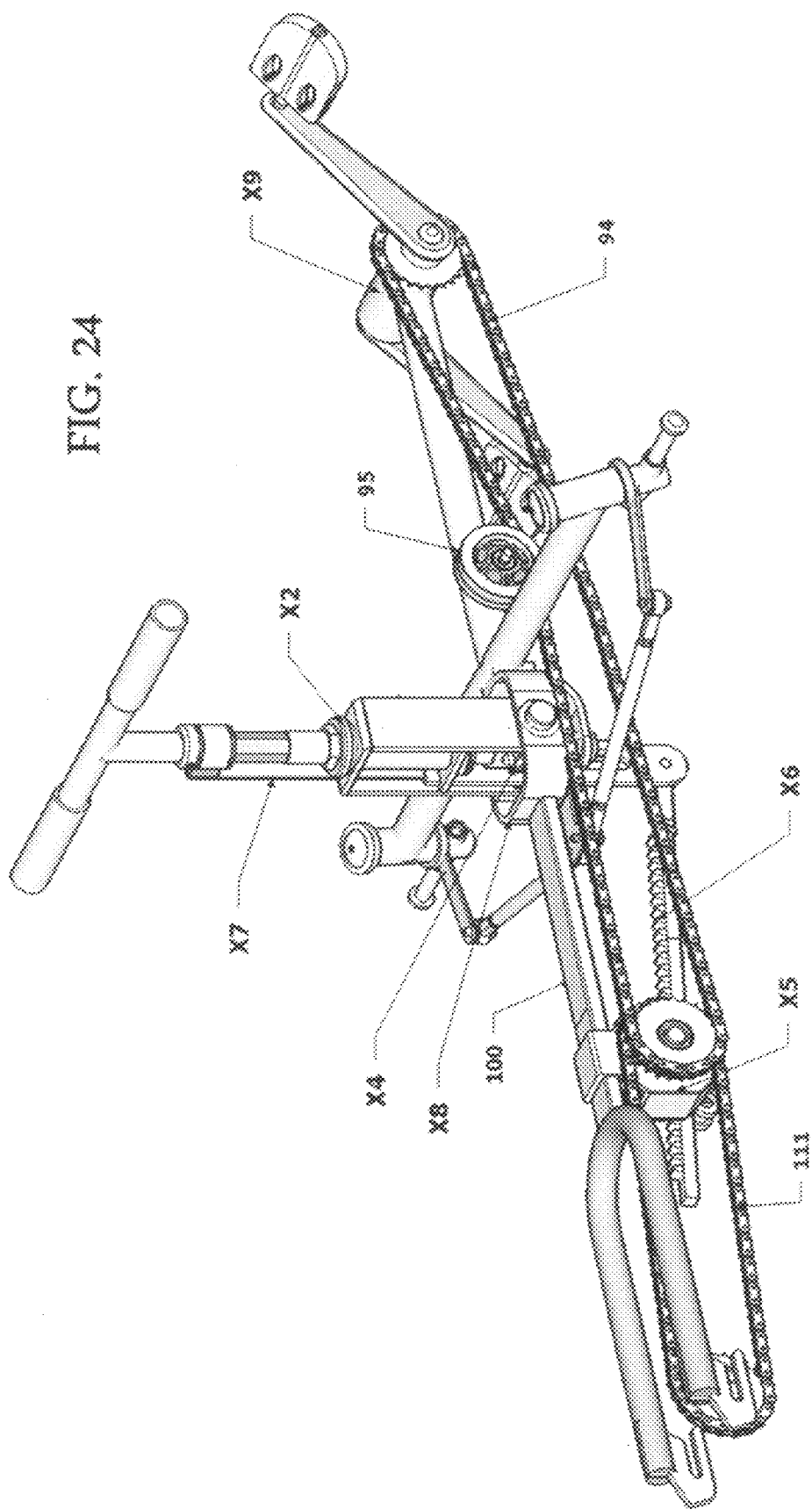
FIG. 24 is an isometric view of the vehicle support utilizing the arm lever assembly (X2), the class 1 slide (X7), the bevel gear converter (X5), the u-joint controller (X4) and the pedal assembly (X9).

Referring now to FIG. 24 of the front steer vehicle support and an example of its abilities to support various components wherein the arm lever assembly (X2) utilizing the u-joint controller (X4) is linked to the converter (X5) with the rack link (X6). The pedal assembly (X9) is attached to the front of the frame (100) and linked to the converter (X5). The converter (X5) and can be adjusted along the frame (100) to eliminate unwanted slack in the chain (94). The chain guide (95) is set to divert the chain (94) from interfering with other components.

Figure 25:
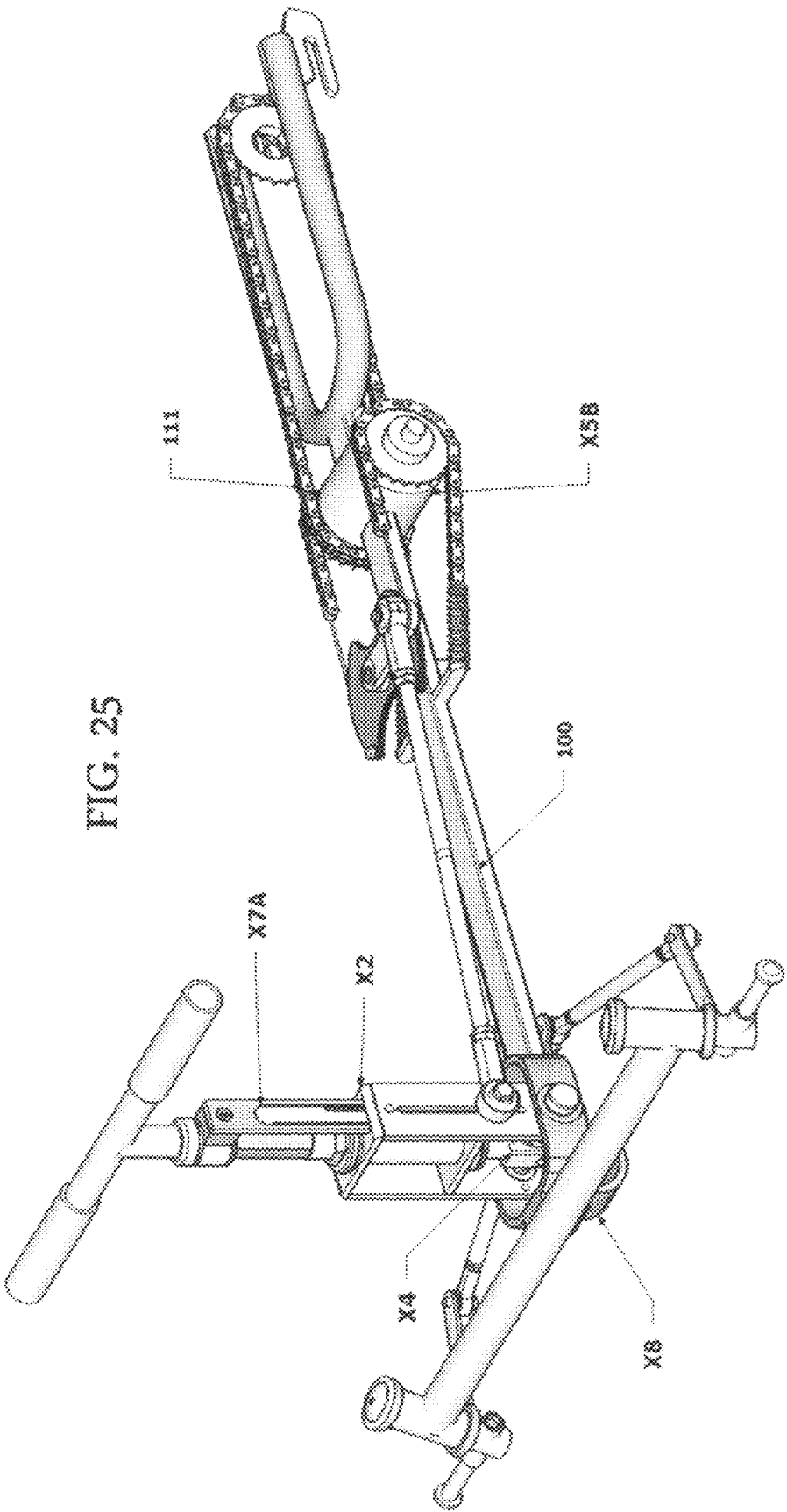
FIG. 25 is an isometric view of the vehicle support utilizing the arm lever assembly (X2), the class 1 slide (X7), the u-joint controller (X4) and the ratchet drive converter (X5B).

Referring now to FIG. 25, of the front steer vehicle support and an example of its abilities to support the various components wherein the arm lever assembly (X2) utilizing the u-joint controller (X4) and the class 2 slide (X7A) linked to the converter (X5B).

Figure 26:
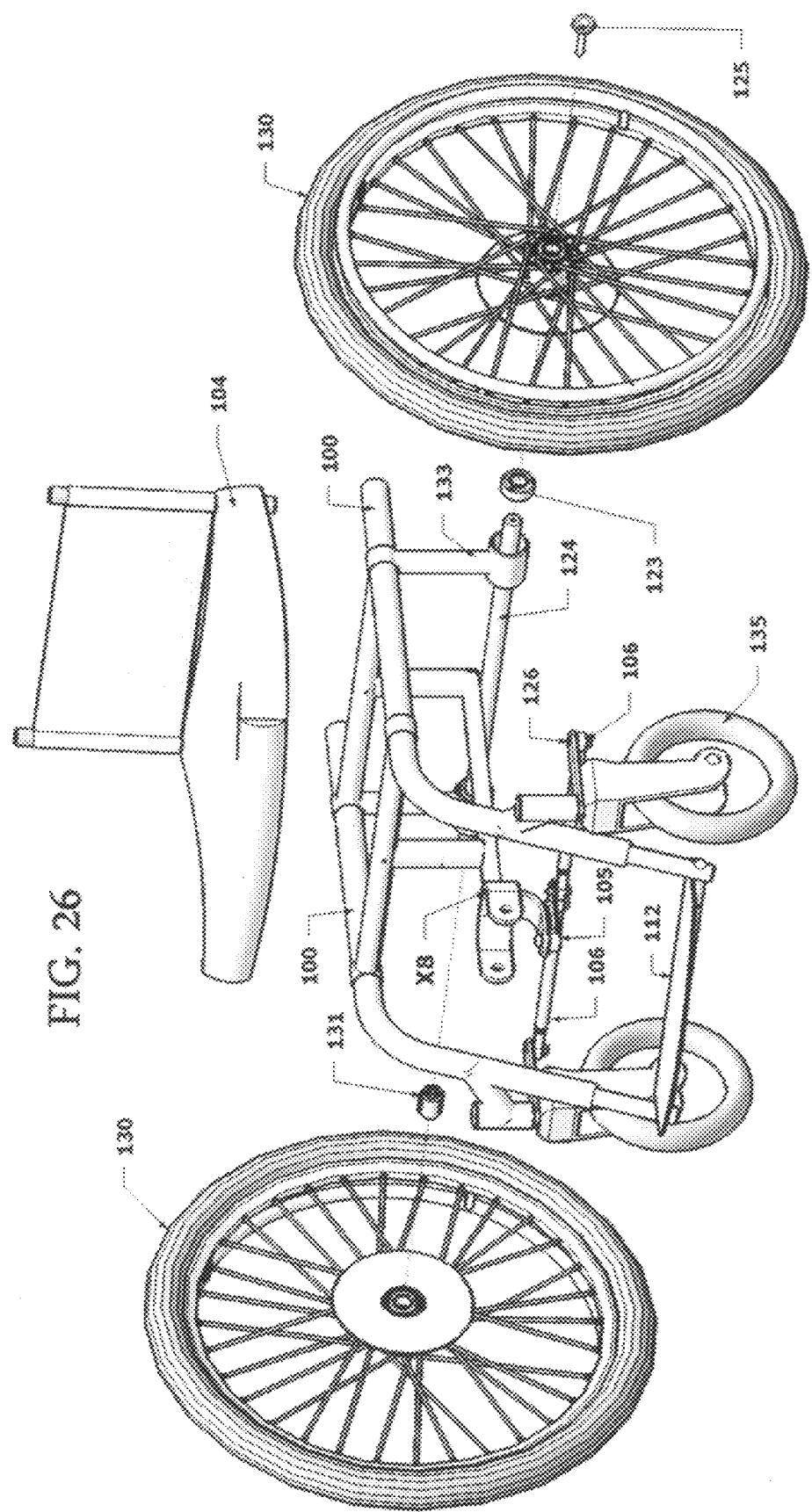
FIG. 26 is an isometric view of the front-steer wheelchair support exploded.

Referring now to FIG. 26, there is illustrated the front-steer wheelchair support wherein the propulsion wheels (130) are fitted with the clutches (131) and supported on each end of the axle (124) and held in place by the quick release pins (125). The axle supports (133), being part of the frame (100), are fitted with the axle bearings (123) that support the axle (124) near each end. The caster-wheel assemblies (135) are pivotally supported by the frame (100) and fitted with the steering arms (126). The tie rods (106), having pivot joints on each end, are pivotally connected the steering arms (126) to the pitman arm (105) further the pitman arm (105) is pivotally attached to the pivot support (X8). The seat (104) is attached to top of the frame (100).

Figure 27:
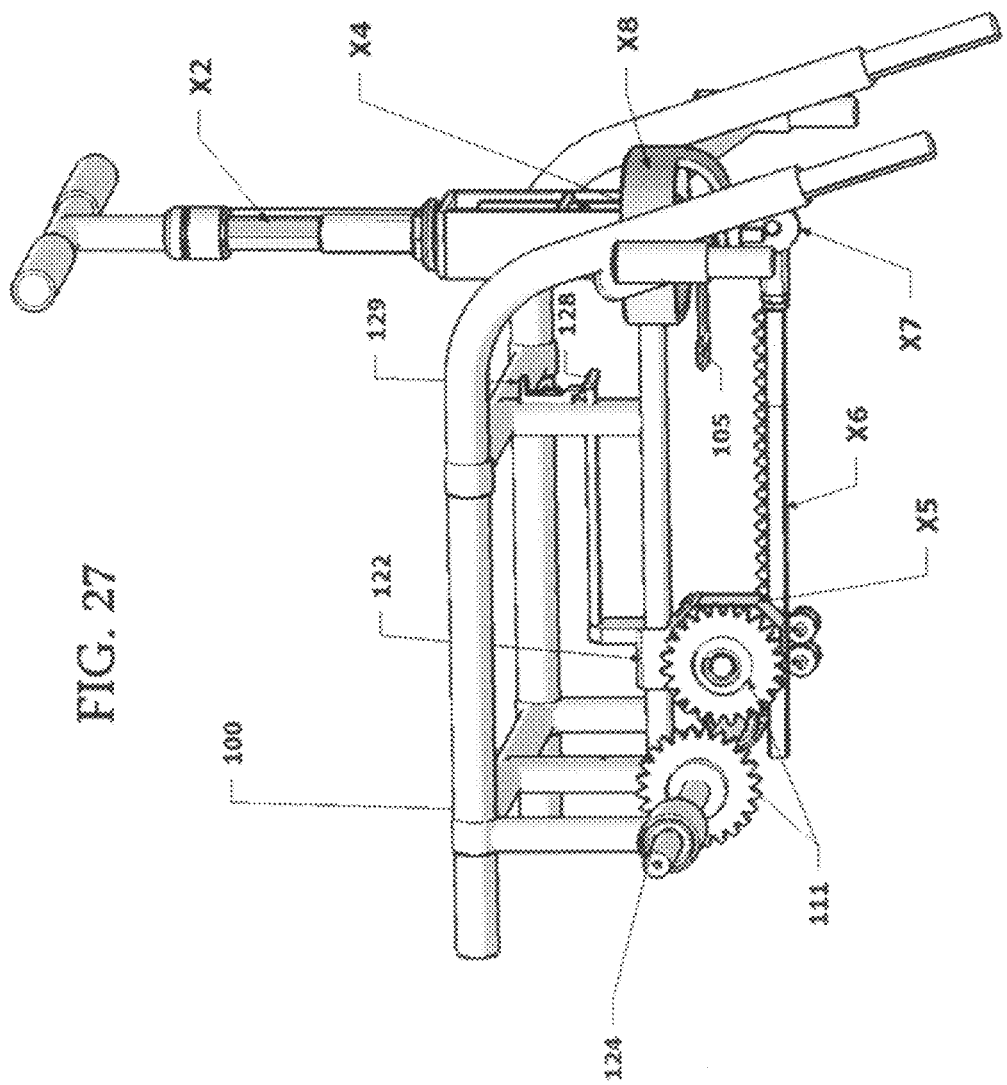
FIG. 27 is an isometric view of certain parts of the front-steer wheelchair support utilizing the arm lever assembly (X2), the u-joint controller (X4), the cable controller (X3), the class 1 slide (X7) and the bevel gear converter (X5).

Referring now to FIG. 27, there is only various parts of the front-steer wheelchair support shown to illustrate how the human-powered-system can be supported when the arm lever assembly (X2) and the converter (X5) are separated.

The arm lever assembly (X2) utilizing the u-joint controller (X4) is pivotally supported by the pivot support (X8). The class 1 slide (X7), and linked to the converter (X5) by the rack link (X6). The converter (X5) is linearly supported by the slide bracket (122) connected to the slide activator (128), which passes through part of the frame (100) behind the pivot support (X8). When the locking tab (129) is slid upward the slide activator (128) can be pulled forward pulling the slide bracket (122) forward disengaging the output links (111) allowing the front-steer wheelchair support to be manually moved in reverse. When the slide activator (128) is pushed rearward it pushes the slide bracket (122) rearward and engages the output links (111) when the locking tab (129) is slid downward locking the slide activator (128) rearward allowing the reciprocal movements of the arm lever assembly (X2) to propel the front-steer wheelchair support. Further the u-joint controller (X4) is utilized and connected directly to the pitman arm (105), although the cable controller (X3) can also be utilized.

Figure 28:
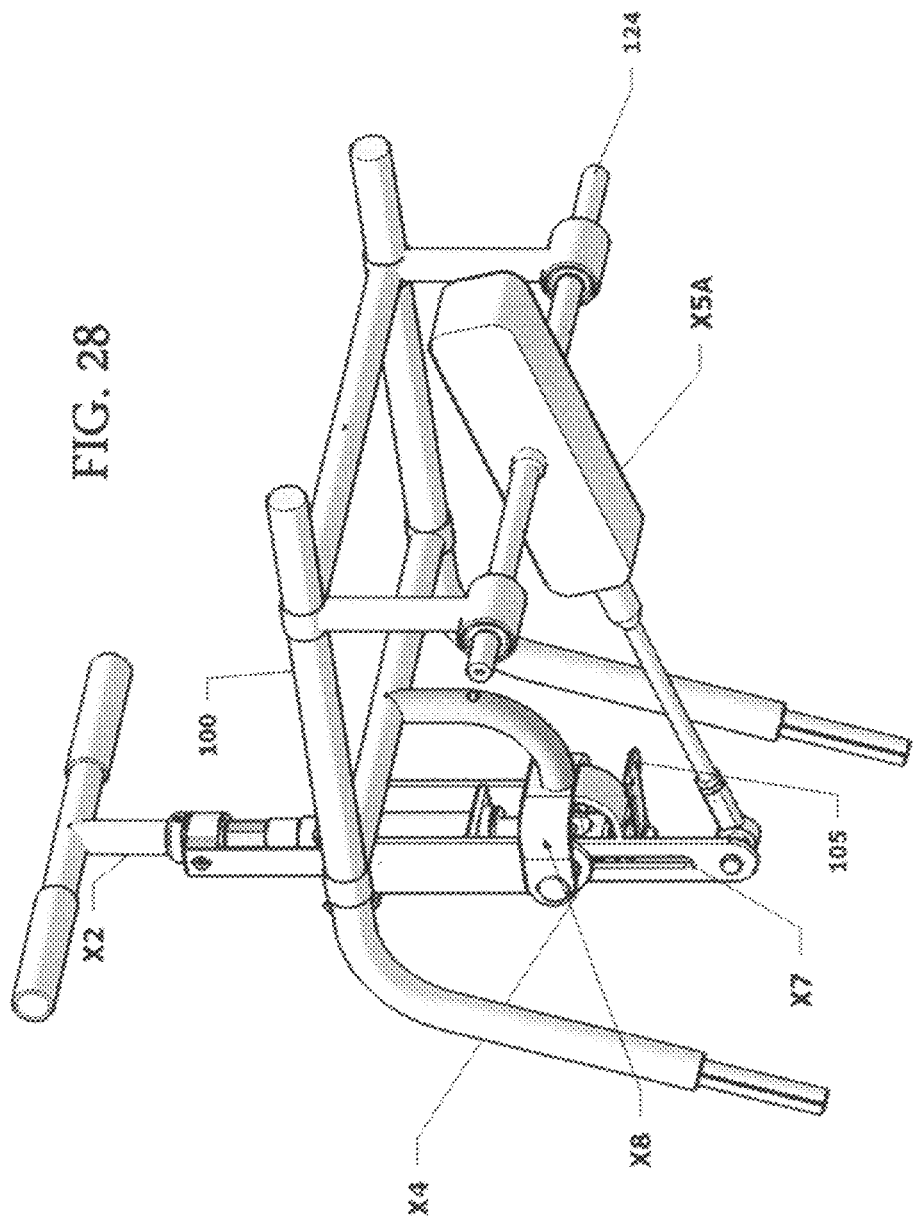
FIG. 28 is an isometric view of certain parts of the front-steer wheelchair support utilizing the arm lever assembly (X2) linked directly to the rack drive converter (X5A).

Referring now to FIG. 28, there is only various parts of the front-steer wheelchair support shown to illustrate how the human-powered-system is supported when the arm lever assembly (X2) is connected to the rack converter (X5A).

The arm lever assembly (X2), utilizing the class 1 slide (X7), is pivotally supported by the pivot support (X8) and linked to the converter (X5A), further utilizing the u-joint controller (X4). The rack converter (X5A) is connected directly to the axle (124) without any output link.

Figure 29:
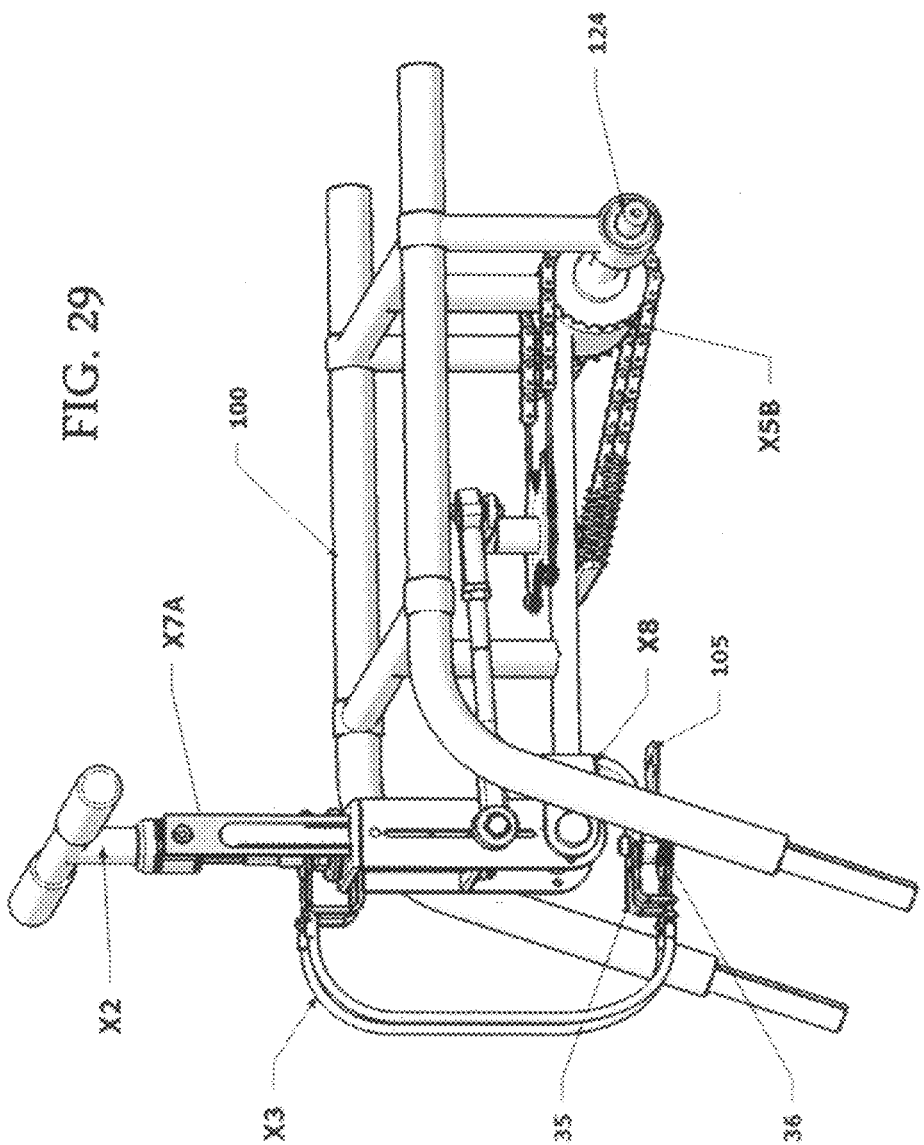
FIG. 29 is an isometric view of certain parts of the front-steer wheelchair support utilizing the arm lever assembly (X2) linked tot the ratchet drive converter (X5B).

Referring now to FIG. 29, there is only various parts of the front-steer wheelchair support shown to illustrate how the human-powered-system can be supported when the arm lever assembly (X2) utilizing the class 2 slide (X7A) is connected to the rack converter (X5A).

Figure 30:
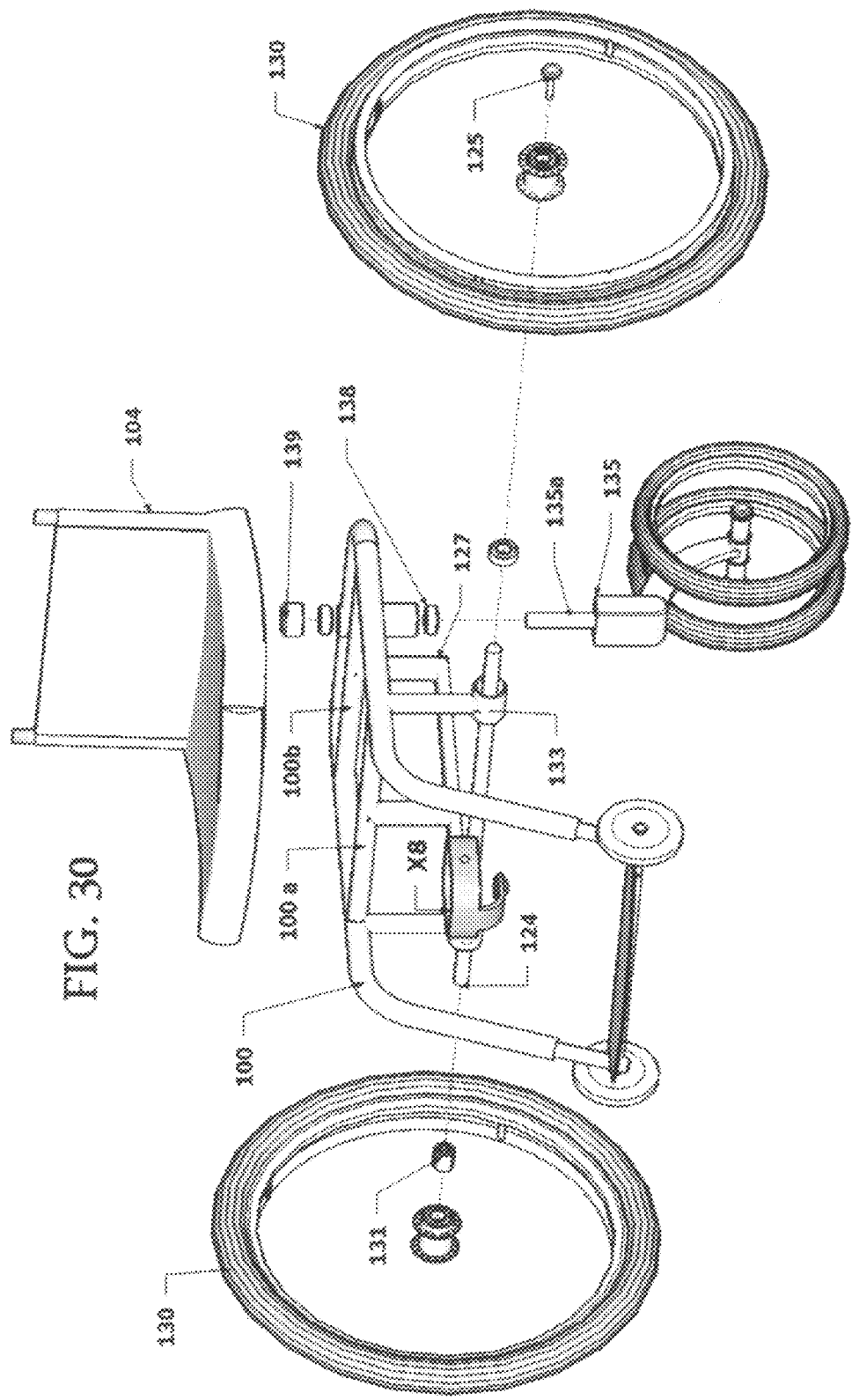
FIG. 30 is an isometric view of the rear steer wheelchair exploded.

Referring now to FIG. 30, there is illustrated the rear-steer wheelchair support wherein the propulsion wheels (130) are fitted with the clutches (131) and supported on each end of the axle (124) and held in place by the quick release pins (125). The axle supports (133), being part of the frame (100), are fitted with the axle bearings (123) that support the axle (124) near each end. The caster-wheel assembly (135) is pivotally supported by the frame (100) rear of the seat (104). The caster kingpin (135a) is rationally supported by the bearings (138) fitted into each end of a tube attached to the frame (100) rear of the seat (104). The pivot support (X8) is attached to the front cross member (100a), that is part of the frame (100), and the support post (127) is attached to the rear cross member (100b) that is also part of the frame (100).

Figure 31:
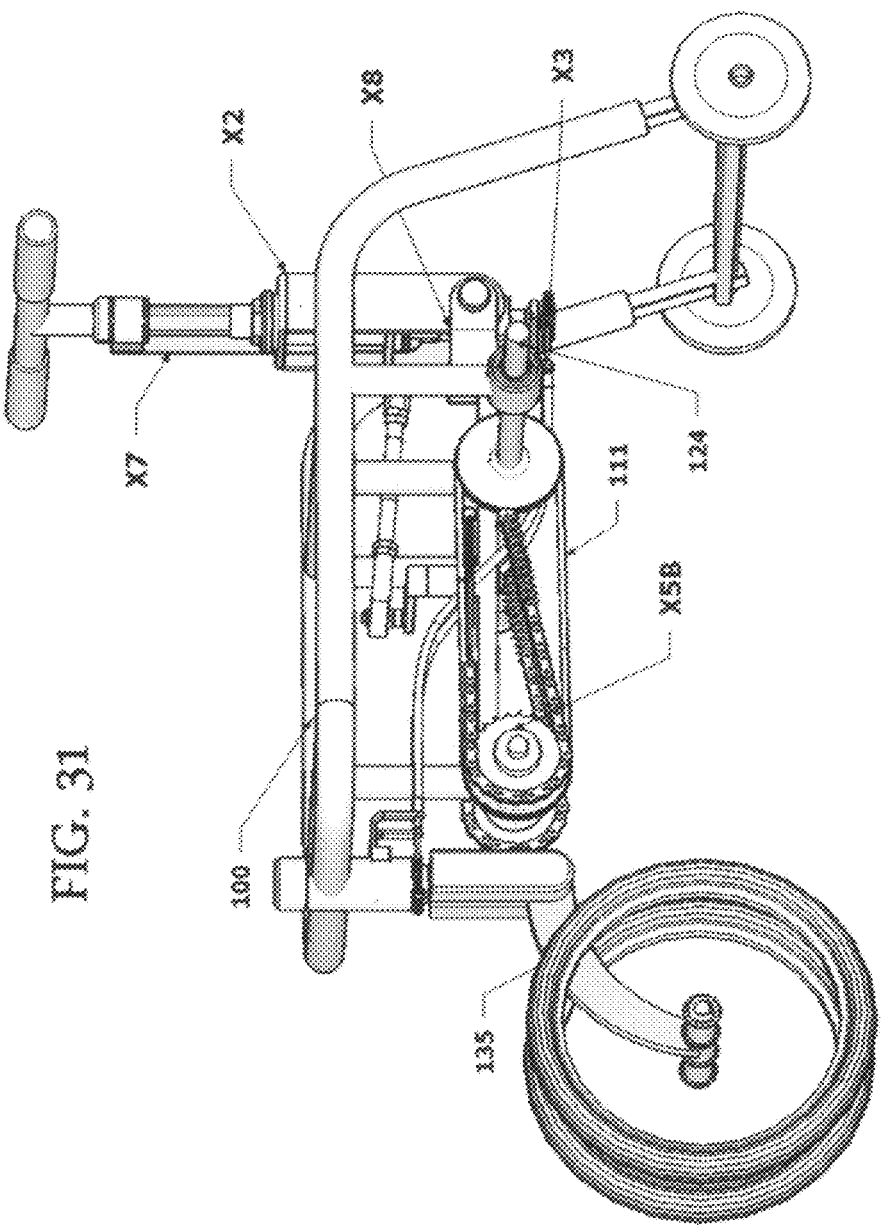
FIG. 31 is an isometric view of the rear steer wheelchair utilizing the arm lever assembly (X2), the class 1 slide (X7), the cable controller (X3) and the ratchet drive converter (X5B).

Referring now to FIG. 31, there is shown various components of the rear-steer wheelchair support supporting arm lever assembly (X2) utilizing the class 2 slide (X7A) connected to the ratchet drive converter (X5B) is supported by the rear-steer wheelchair frame. The cable controller (X3) is utilized by the arm lever assembly (X2) and connected to the caster-wheel assembly (135). The output link (111) utilized is shown as a two pulleys and a belt.

Referring now to FIG. 32, there is shown various components of the rear-steer wheelchair support supporting arm lever assembly (X2) utilizing the class 1 slide (X7) connected to the bevel gear converter (X5) by the rack link (X6). The cable controller (X3) connects the caster-wheel assembly (135) to the u-joint controller (X4) pivotally supported by the pivot support (X8). The output link (111) is shown as two pulleys and a belt. The bevel gear converter (X5) is slidely supported by the slide bracket (122) that is activated by pushing or pulling on the slide activator (128) that can be locked in place by sliding the locking tab (129) downward. To move the rear-steer wheelchair support in reverse the operator pulls up on the locking tab (129) and pulls the slide activator (128) forward which in turn slides the slide bracket (122) and the bevel gear converter (X5) forward relieving tension on the belt of the output link (111). The opposite is done to power the rear-steer wheelchair support forward with the arm lever assembly.

The invention I claim is:

1. A human-propulsion-system having an arm lever assembly with a force end that is telescoping, a fulcrum point, and a load point that correspondingly changes distance from the fulcrum point when the force end is extended or retracted comprising:

an arm lever having at least two telescoping sections wherein, one is a lower section that telescopically supports an upper section while maintaining rotational unity, further the upper section provides the force end and is graspable by at least one hand of an operator;

a reciprocating member supports the lower section rotationally free and further provides the fulcrum point to allow the operator to reciprocate the arm lever assembly;

a sliding mechanism, that provides the load point, is linearly supported by the reciprocating member and further connected to the telescoping action of the upper section;

a controller operatively connecting the rotational movements of the arm lever assembly to a controlled (steerable) assembly;

a support mechanism comprising: a pivot support that pivotally supports the arm lever assembly at the fulcrum point; a frame attached to the pivot support; a seat supported by the frame to support the operator; and a leg member attached to the frame forward of the seat that is utilized by the operator's legs; and a converter, having an input end and an output end, wherein the input end acts upon the reciprocating movements of the arm lever assembly and converts them into a unidirectional rotation of the output end to be utilized to motivate a function of the supports mechanism, further the converter is operatively supported by the frame.

2. A human-propulsion-system as defined in claim 1 wherein slide mechanism is a class 1 slide utilized by the arm lever assembly relative to a class 1 lever comprising:
   a rotary collar comprising; a bearing with lock collar supported about the O.D. of the upper section; and
   a slide comprising a length of rigid material being supported by the reciprocating member linearly free, further having the load point near one end and extending past the fulcrum point and connecting to the rotary collar near the opposite end.

3. An human-propulsion-system as defined in claim 1 wherein slide mechanism is a class 2 slide utilized by the arm lever assembly relative to a class 2 lever comprising:
   a rotary collar comprising; a bearing with lock collar supported about the O.D. of the upper section; and
   a rack slide comprising a pinion gear supported rotationally free on one side of the reciprocating member; a force rack gear, having a top end and a bottom end, wherein the top end is attached to the rotary collar; and a load rack gear, having a top and bottom end, wherein the bottom end provides the load point, further the force rack gear and the load rack gear are parallel and laterally spaced to one another with the pinion gear properly intermeshed between them, in such a way, that when the force rack gear is forced downward the load rack gear correspondingly retracts upward and when the force rack gear is forced upward the load rack gear correspondingly extends downward.

4. A human-propulsion-system as defined in claim 1 wherein the controller is a u-joint controller comprising:
   a third pivot point attached to the pivot support right angle to and spaced from the two side pivot points;
   a universal joint having an upper half and a lower half wherein the upper half is axially coupled to the bottom of lower section;
   at least one pitman arm, capable of supporting at least one tie rod, is pivotally supported by the third pivot point and axially coupled to the lower half; and
   at least one tie rod having a pivot joint on each end.

5. A human-propulsion-system as defined in claim 1 wherein the controller is a cable controller comprising:
   at least two cables each having at least one section of cable housing and at least one barrel end;
   at least two cable tension adjusters wherein each supports one end of opposite sections of cable housing;
   a cable retainer supports the cable tension adjusters and is attached to the reciprocating member;
   a rotary member axially coupled about the O.D. of the lower section of further, the rotary member operatively supports one barrel end of each the two cables on opposite sides of the lower section;
   a mountable cable retainer supports the cable housing ends not supported by the cable tension adjusters further the mountable cable retainer is mounted near the controlled assembly; and
   a rotary receiver is operatively fixed to the pitman arm and operatively supports the cable ends not connected to the rotary member further the rotary receiver corresponds with the rotational movements of the rotary member.

6. A human-propulsion-system as defined in claim 1 wherein the leg member is a leg support that supports the operator's legs in a resting manner.

7. A human-propulsion-system as defined in claim 1 wherein the leg member is a pedal assembly, capable of working separately and in conjunction with the arm lever assembly, is fixed to the support mechanism in reach of and rotated by the operators feet further operatively linked to the output end of the converter comprising:
   a crank set supporting at least one gear ring and pedals;
   an extension comprising at least one length of sufficiently rigid material that rotationally supports the crank set near one end and attached to the support mechanism near the other end; and
   a free-wheel sprocket operatively coupled to the output end of the converter and rotationally linked to the crank set further correspondingly rotating with the crank set rotations.

8. A human-propulsion-system as defined in claim 1 wherein the output end of the converter utilizes an output link, consisting of at least two chain rings and a chain, at least two corresponding spur gears, or at least two pulleys and a belt, that operatively connects the output end to a rotational function of the support mechanism.

9. A human-propulsion-system as defined in claim 1 wherein the converter is a bevel gear converter comprising:
   two bevel gears wherein each is having a bored center operatively fitted with at least one clutch;
   a common shaft coaxially supports both of the bevel gears with at least one idler-gear properly intermeshed between them forming a gear setup; and
   a housing supports the components of the gear setup rotationally free further maintaining the tolerances needed for proper operation of the gear setup.

10. A converter as defined in claim 9 further comprises a rack link operatively connecting the load point to the input end of the converter comprising:
    an input gear axially coupled to the input end of the bevel gear converter;
    a length of rack gear that corresponds with the input gear further being pivotally connected by one end to the load point; and
    a rack guide that linearly and pivotally supports the rack gear maintaining proper contact with the input gear.

11. A converter as defined in claim 9 further comprises a pushrod link operatively connecting the load point to the input end of the converter comprising:
    a driven lever is connected by one end to the input end and connected by the opposite end to one end of a pushrod; and
    a push rod, having a pivot joint on each end, is pivotally connects the load point to the driven lever.

12. A human-propulsion-system as defined in claim 1 wherein the converter is a rack drive converter comprising:
    a common shaft being the output end;
    two rack and pinion gear setups comprising; two pinion gears each having a bored center fitted with at least a one clutch and coaxially supported on the common shaft so that both of the pinion gears engage the common shaft in like rotational direction, further two rack gears wherein one rack gear corresponds with the north O.D. of one of the pinion gears and other rack gear corresponds with the south O.D. of the other said pinion gears, further the rack gears are parallel and fixed together at corresponding ends by a brace to form a rack gear unit; and a push rod having one end pivotally connected to the load point and the opposite end is attached to one end of the rack gear unit.

13. A human-propulsion-system as defined in claim 1 wherein the converter is a ratchet drive converter comprising:
a horizontal common shaft being the output end;
at least two ratchet cog wheels each, having a plurality of cogs, coaxially supported by the horizontal common shaft, further laterally spaced and arranged to drive the common shaft in a like direction;
at least two drive links each comprising; a chain that correspondingly wraps about one of the ratchet cog wheels, a pulling spring connecting one end of the chain to the support mechanism, a length of cable connecting the opposite end of the chain to a common idler bracket;
an idler bracket having a center rotationally supported by a vertical shaft, a left wing that connects to the barrel end of the cable on the left and a right wing that connects to the barrel end of the cable on the right; and
a push rod connecting the load point to the idler bracket, further when the arm lever assembly reciprocates the push rod pivots the idler bracket left and right pulling on the corresponding drive link, driving the corresponding ratchet cog wheel, driving the common shaft (with both the for and aft reciprocal movements.

14. A human-propulsion-system as defined in claim 1 wherein the support mechanism is further comprising:
a slide bracket linearly supported by the frame that is utilized to engage and disengage the output links; and
a slide activator that controls the linear adjustment of the slide bracket.

15. A human-propulsion-system as defined in claim 1 wherein the support mechanism is a front steer vehicle further comprising:
a plurality of wheels;
at least one of the plurality of wheels is a drive wheel, having at least one gear ratio, and operatively linked to the output end of the converter to propel the support mechanism forward;
a fork attached, by one end, to the frame further operatively supports at least one drive wheel near the opposite end;
at least two of the plurality of wheels are steerable wheels laterally spaced and rotationally supported by kingpins pivotally supported on each end of a cross member attached to the frame forward of the seat further the steerable wheels are operatively linked to the controller to act upon the steering commands of the operator and alter the direction of travel; and
at least one type of a hand lever activated bicycle-braking system operatively connected to at least one of the plurality of wheels.

16. A front-steer-vehicle as defined in claim 15 wherein the fork operatively supports at least two drive wheels each being fitted with at least one clutch and rotationally supported on opposite ends of an axle that operatively supports at least one gear ratio operatively linked to the output end, further the clutches are arranged to engage the propulsion wheel in forward rotation.

17. A front-steer-vehicle as defined in claim 15 wherein the fork is pivotally attached to the frame further comprising: a shock absorber operatively linked to both the frame and the fork providing rear suspension; and the cross member is further hinged with shock absorbers operatively supporting each steerable wheel in an independent suspension manner.

18. A human-propulsion-system as defined in claim 1 wherein the support mechanism is a rear-steer vehicle further comprising:
an axle supported by the frame rotationally free and operatively linked to the output end;
a plurality of wheels wherein at least two of the plurality of wheels are propulsion wheels each being fitted with at least one clutch and rotationally supported by opposite ends of the axle further the clutches are arranged to engage the propulsion wheel in forward rotation;
at least one of the plurality of wheels is a steerable wheel pivotally supported by the frame rearward of the axle and operatively linked to the controller to act upon the steering commands of the operator and alter the direction of travel; and
at least one type of a hand lever activated bicycle-braking system operatively connected to at least one of the plurality of wheels to slow or stop the support mechanism.

19. A rear-steer vehicle with suspension as defined in claim 18 further comprising:
a swing-arm pivotally attached, near one end, to the frame and supporting the axle rotationally free near the opposite end;
a shock absorber operatively linked to both the frame and the swing-arm; and
the steerable wheel is hingedly supported with a shock absorber to provide dampening.

20. A human-propulsion-system as defined in claim 1 wherein the support mechanism is a front-steer wheelchair further comprising:
an axle supported by the frame rotationally free and operatively linked to the output end;
a plurality of wheels wherein at least two of the plurality of wheels are propulsion wheels each being fitted with at least one clutch and rotationally supported by opposite ends of the axle further the clutches are arranged to engage the propulsion wheel in forward rotation;
at least one of the plurality of wheels is a steerable wheel pivotally supported by the frame forward of the axle and operatively linked to the controller to act upon the steering commands of the operator and alter the direction of travel; and
at least one type of a hand lever activated bicycle-braking system operatively connected to at least one of the plurality of wheels to slow or stop the support mechanism.

* * * * *